(12) United States Patent
Park et al.

(10) Patent No.: US 10,798,728 B2
(45) Date of Patent: Oct. 6, 2020

(54) METHOD FOR TRANSCEIVING DATA IN UNLICENSED BAND AND APPARATUS FOR SAME

(71) Applicant: LG ELECTRONICS INC., Seoul (KR)

(72) Inventors: Hanjun Park, Seoul (KR); Joonkui Ahn, Seoul (KR); Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,200

(22) PCT Filed: Sep. 21, 2016

(86) PCT No.: PCT/KR2016/010534
§ 371 (c)(1),
(2) Date: Mar. 9, 2018

(87) PCT Pub. No.: WO2017/052193
PCT Pub. Date: Mar. 30, 2017

(65) Prior Publication Data
US 2019/0150170 A1    May 16, 2019

Related U.S. Application Data

(60) Provisional application No. 62/221,165, filed on Sep. 21, 2015, provisional application No. 62/232,409, (Continued)

(51) Int. Cl.
*H04W 72/12* (2009.01)
*H04W 74/08* (2009.01)
*H04W 74/00* (2009.01)

(52) U.S. Cl.
CPC ....... *H04W 72/1268* (2013.01); *H04W 72/12* (2013.01); *H04W 74/00* (2013.01); *H04W 74/08* (2013.01)

(58) Field of Classification Search
CPC ................................................. H04W 72/1268
See application file for complete search history.

(56) References Cited

U.S. PATENT DOCUMENTS

| 2009/0067448 A1 | 3/2009 | Stanwood et al. |
| 2013/0051358 A1* | 2/2013 | Turtinen ........... H04W 74/0816 370/330 |

(Continued)

OTHER PUBLICATIONS

3GPP TSG RAN WG1 #82 R1-154993 Beijing, China Aug. 24-28, 2015 (Year: 2015).*

(Continued)

*Primary Examiner* — Hassan Kizou
*Assistant Examiner* — Deepa Belur
(74) *Attorney, Agent, or Firm* — Lee, Hong, Degerman, Kang & Waimey PC

(57) ABSTRACT

The present invention relates to a wireless communication system, and more particularly, to a method for transceiving data in an unlicensed band and an apparatus for same. In particular, disclosed in the present invention are a method and an apparatus for same, the method comprising: a terminal receiving, from a base station, listen before talk (LBT)-type information and information relating to an uplink data transmission interval during which the data is transmitted from within one subframe; and transmitting the data to the base station only during the uplink data transmission interval from within the one subframe, based on an LBT operation indicated by the LBT-type information, thereby efficiently transceiving data between the terminal and the base station in the unlicensed band.

15 Claims, 12 Drawing Sheets

Related U.S. Application Data filed on Sep. 24, 2015, provisional application No. 62/287,409, filed on Jan. 26, 2016, provisional application No. 62/315,107, filed on Mar. 30, 2016, provisional application No. 62/362,600, filed on Jul. 15, 2016.

(56) References Cited

U.S. PATENT DOCUMENTS

| | | |
|---|---|---|
| 2014/0198735 A1 | 7/2014 | Koskela et al. |
| 2015/0296370 A1* | 10/2015 | Kim ............... H04W 24/08 370/338 |
| 2015/0358826 A1* | 12/2015 | Wei ............... H04W 74/0816 370/329 |
| 2017/0265225 A1* | 9/2017 | Takeda ............ H04W 72/1284 |
| 2017/0325215 A1* | 11/2017 | Takeda ............ H04W 16/14 |
| 2017/0325241 A1* | 11/2017 | Toskala ........... H04W 72/082 |
| 2018/0042048 A1* | 2/2018 | Hugl ............... H04W 74/0808 |
| 2018/0049241 A1* | 2/2018 | Heo ............... H04W 74/0808 |
| 2018/0213563 A1* | 7/2018 | Yang .............. H04W 74/0808 |
| 2018/0220462 A1* | 8/2018 | Kusashima ....... H04W 16/14 |
| 2019/0014596 A1* | 1/2019 | Yang .............. H04W 72/0446 |
| 2019/0124688 A1* | 4/2019 | Golitschek Edler von Elbwart ........... H04L 1/00 |

OTHER PUBLICATIONS

Golitschek Edler von Elbwart US20190124688A1 with foreign priority application filed Aug. 21, 2015 for EP 15182068.5 (Year: 2015).*

PCT International Application No. PCT/KR2016/010534, Written Opinion of the International Searching Authority dated Dec. 30, 2016, 24 pages.

LG Electronics, "LBT operation for LAA UL", 3GPP TSG RAN WG1 Meeting #81, R1-152735, May 2015, 5 pages.

Ericsson, et al., "WF on DL LBT priority classes", 3GPP TSG RAN WG1 Meeting #82, R1-154993, Aug. 2015, 3 pages.

LG Electronics, "LBT operation for LAA DL", 3GPP TSG RAN WG1 Meeting #81, R1-152733, May 2015, 7 pages.

European Patent Office Application Serial No. 168489193, Search Report dated Mar. 13, 2019, 8 pages.

Alcatel-Lucent, et al., "UL LBT and DL/UL Frame Structure for LAA", 3GPP TSG RAN WG1 Meeting #82, R1-154574, XP051039505, Aug. 2015, 6 pages.

Intel, "Uplink transmission with LBT", 3GPP TSG RAN WG2 Meeting #89bis, R2-151102, XP050953215, Apr. 2015, 6 pages.

* cited by examiner

FIG. 9
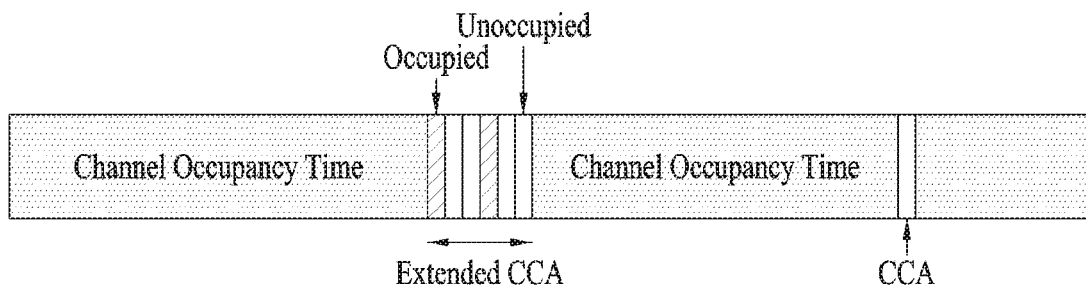
(a)
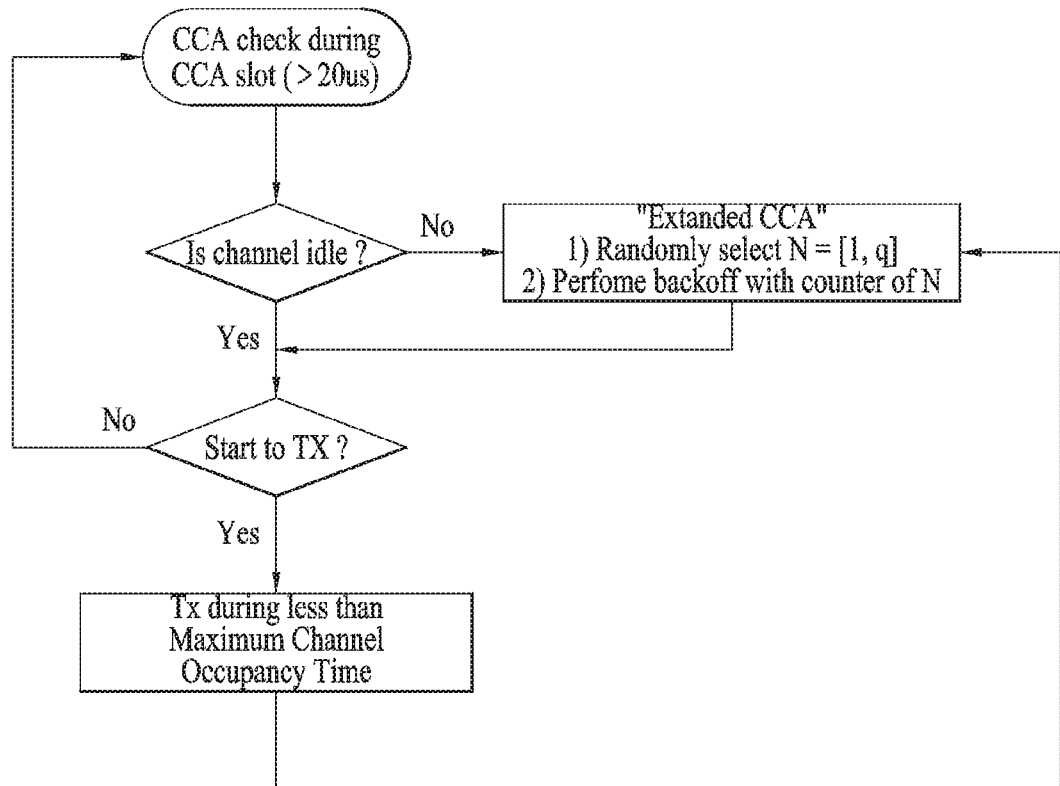
(b)

METHOD FOR TRANSCEIVING DATA IN UNLICENSED BAND AND APPARATUS FOR SAME

CROSS-REFERENCE TO RELATED APPLICATIONS

This application is the National Stage filing under 35 U.S.C. 371 of International Application No. PCT/KR2016/010534, filed on Sep. 21, 2016, which claims the benefit of U.S. Provisional Application No. 62/221,165, filed on Sep. 21, 2015, 62/232,409, filed on Sep. 24, 2015, 62/287,409, filed on Jan. 26, 2016, 62/315,107, filed on Mar. 30, 2016, and 62/362,600, filed on Jul. 15, 2016, the contents of which are all hereby incorporated by reference herein in their entirety.

TECHNICAL FIELD

The present invention relates to a wireless communication system, and more particularly, to a method of transmitting and receiving data in an unlicensed band and an apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE OF THE INVENTION

Technical Task

A technical task of the present invention is to provide a method of transceiving data between a base station and a user equipment in an unlicensed band.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of transmitting data, which is transmitted by a user equipment in an unlicensed band, comprises the steps of receiving LBT (listen before talk) type information and information on an uplink data transmission period during which the data is transmitted in a subframe from a base station, and transmitting the data to the base station via the unlicensed band during the uplink data transmission period only in the subframe based on an LBT operation indicated by the LBT type information.

To further achieve these and other advantages and in accordance with the purpose of the present invention, according to a different embodiment, a method of receiving data, which is received by a base station from a user equipment operating in an unlicensed band, comprises the steps of transmitting LBT (listen before talk) type information and information on an uplink data transmission period during which the data is transmitted in a subframe to the user equipment, and receiving the data via the unlicensed band during the uplink data transmission period only in the subframe from the user equipment operating based on an LBT operation indicated by the LBT type information.

To further achieve these and other advantages and in accordance with the purpose of the present invention, according to a further different embodiment, a user equipment configured to perform data transmission in an unlicensed band includes an RF (radio frequency) unit, and a processor configured to control the RF unit, the processor configured to receive LBT (listen before talk) type information and information on an uplink data transmission period during which the data is transmitted in a subframe from a base station, the processor configured to transmit the data to the base station during the uplink data transmission period only in the subframe based on an LBT operation indicated by the LBT type information.

To further achieve these and other advantages and in accordance with the purpose of the present invention, according to a further different embodiment, a base station configured to receive data in an unlicensed band includes an RF (radio frequency) unit, and a processor configured to control the RF unit, the processor configured to transmit LBT (listen before talk) type information and information on an uplink data transmission period during which the data is transmitted in a subframe to the user equipment, the processor configured to receive the data during the uplink data transmission period only in the subframe from the user equipment operating based on an LBT operation indicated by the LBT type information.

In the embodiments of the present invention, the LBT type information can indicate one of a first LBT operation performing data transmission according to a CCA result value after CCA (clear channel assessment) is performed for prescribed time and a second LBT operation performing data transmission based on a back-off.

In this case, if the LBT type information indicates the second LBT operation, the LBT type information can additionally indicate a priority class among a plurality of priority classes to which a parameter value for the second LBT operation is set.

For example, the parameter value for the second LBT operation can include at least one selected from the group consisting of a defer period length, a minimum contention window size (CWS), a maximum contention window size, and maximum channel occupancy time (MCOT).

And, the information on the uplink data transmission period can include starting position information on a starting position at which transmission of the data starts in the subframe.

In this case, the starting position information indicates one selected from the group consisting of a start point of a symbol #0 of the subframe, a start point of a symbol #1 of the subframe, timing after 25 us from the start point of the symbol #0 of the subframe, and timing after 25 us+TA (timing advance) applied to the user equipment from the start point of the symbol #0 of the subframe and the subframe can include symbols ranging from the symbol #0 to a symbol #13.

And, the LBT type information and the starting position information can be transmitted to the user equipment in a manner of being jointly coded.

For example, the information on the uplink data transmission period can additionally include transmission gap configuration information indicating that the transmission of the data is restricted in the N (N is an integer equal to or greater than 0) number of contiguous symbols including the last symbol in time domain among a plurality of symbols included in the subframe.

As a different example, the information on the uplink data transmission period can include first transmission gap configuration information indicating that the transmission of the data is restricted in the M (M is an integer equal to or greater than 0) number of contiguous symbols including the first symbol in time domain among a plurality of symbols included in the subframe, and second transmission gap configuration information indicating that the transmission of the data is restricted in the N (N is an integer equal to or greater than 0) number of contiguous symbols including the last symbol in time domain among a plurality of symbols included in the subframe.

And, if an SRS (sounding reference signal) symbol is not included in the uplink data transmission period, the user equipment may not transmit an SRS in the subframe.

In this case, the user equipment may perform an LBT operation during a period rather than the uplink data transmission period in the subframe.

The above-described aspects of the present invention are merely a part of preferred embodiments of the present invention. Those skilled in the art will derive and understand various embodiments reflecting the technical features of the present invention from the following detailed description of the present invention.

Advantageous Effects

According to one embodiment of the present invention, it is able to efficiently transmit and receive data between a user equipment and a base station in an unlicensed band.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 9 is a diagram illustrating an exemplary Load Based Equipment (LBE) operation as one of the LBT operations.

MODE FOR INVENTION

Figure 1:
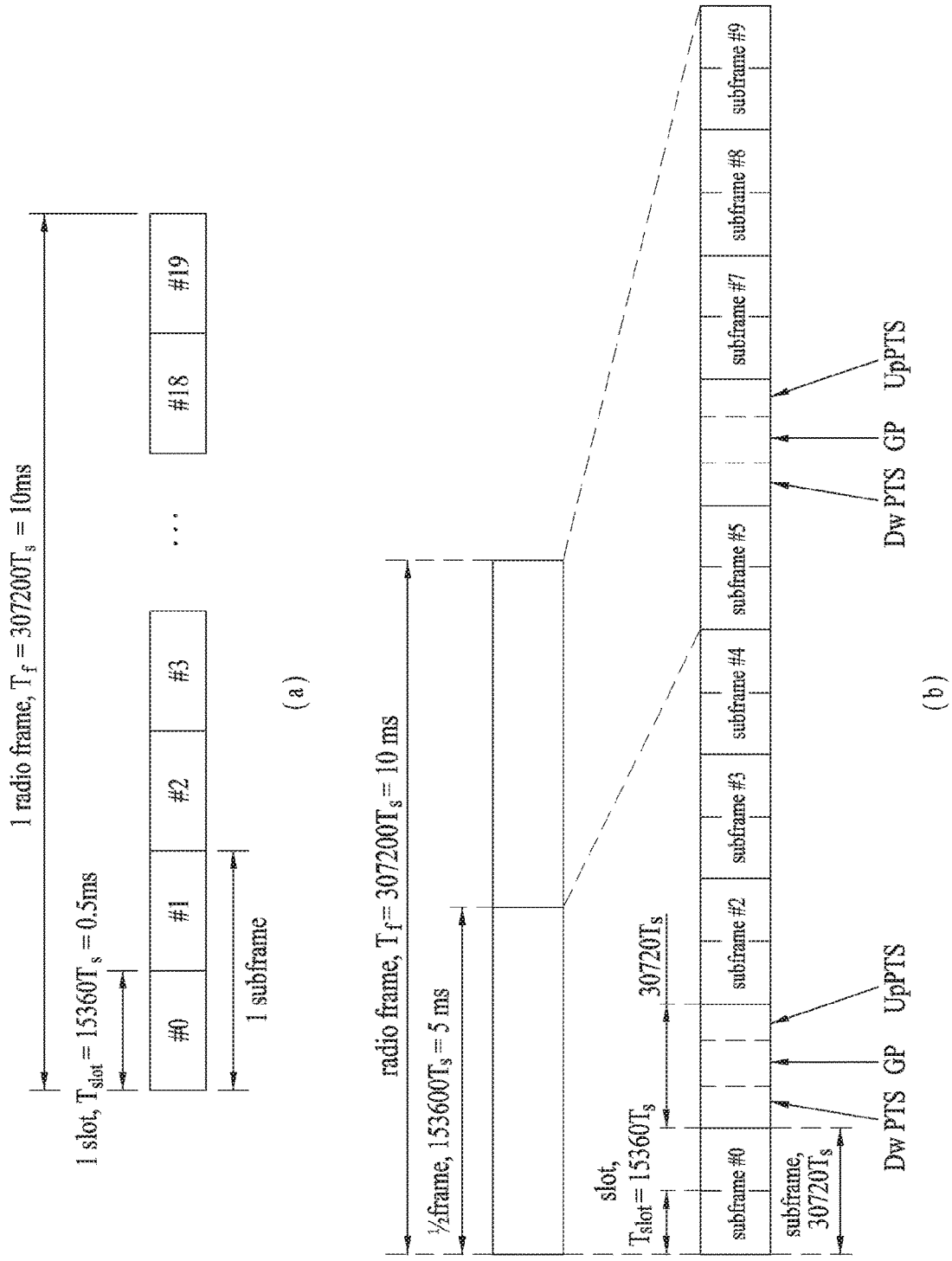
FIG. 1 illustrates a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | | | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | $2192 \cdot T_s$ | $2560 \cdot T_s$ | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | | | $20480 \cdot T_s$ | | |
| 6 | $19760 \cdot T_s$ | $4384 \cdot T_s$ | $5120 \cdot T_s$ | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
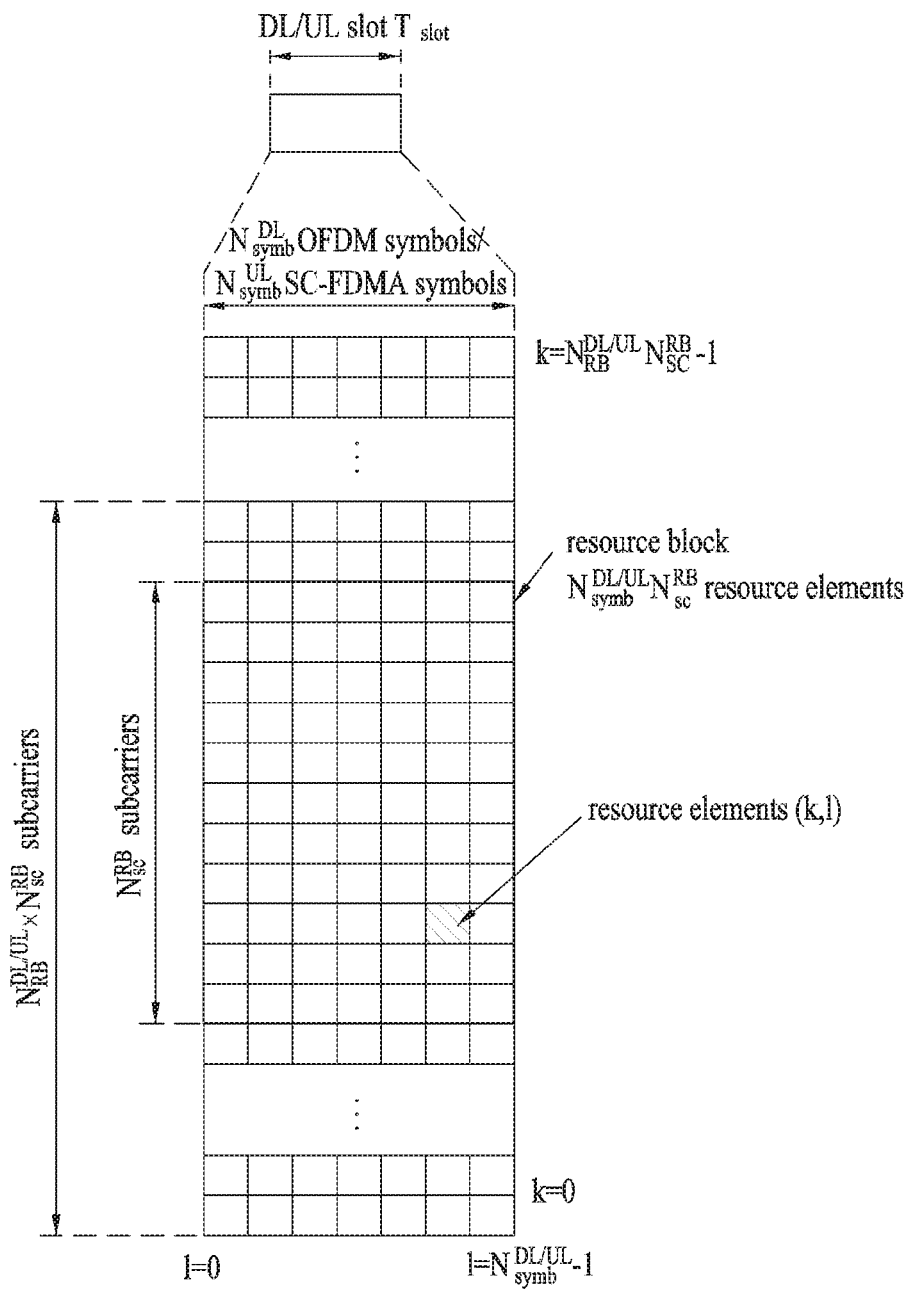
FIG. 2 illustrates structures of downlink/uplink (DL/UL) slots of a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $R_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB-1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs thorugh interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
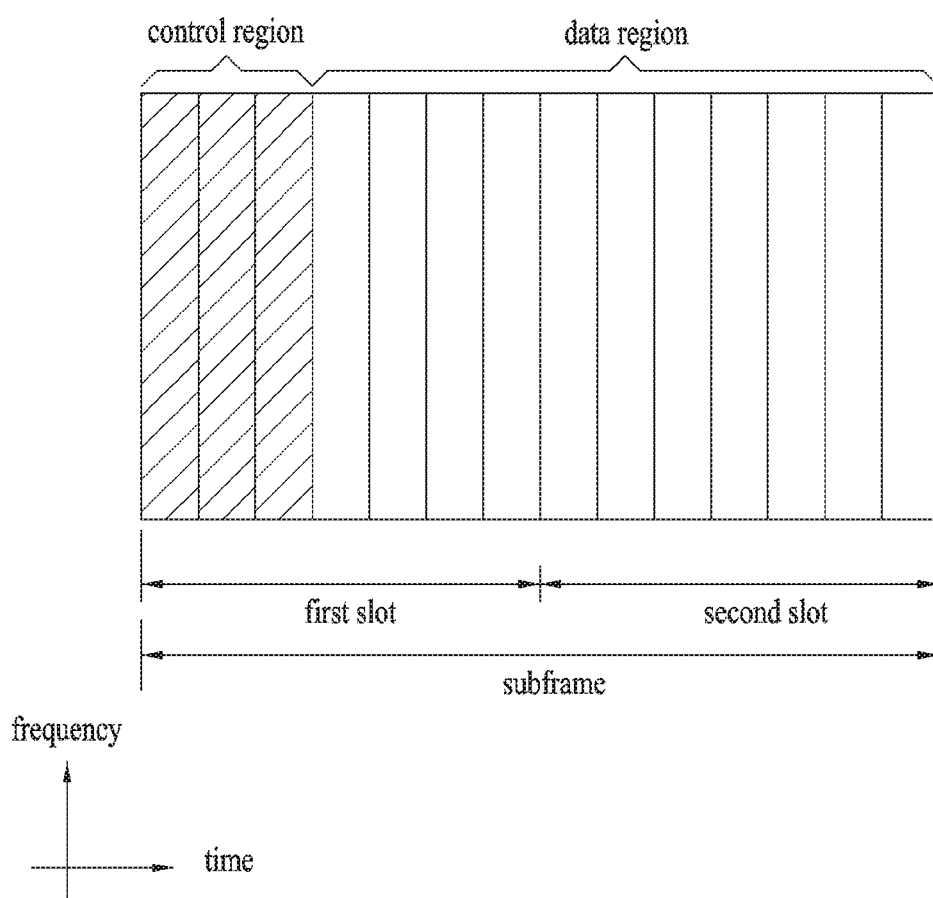
FIG. 3 illustrates a structure of a downlink (DL) subframe used in 3GPP LTE/LTE-A systems.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| Search Space | | | Number of PDCCH |
|---|---|---|---|
| Type | Aggregation Level L | Size [in CCEs] | candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
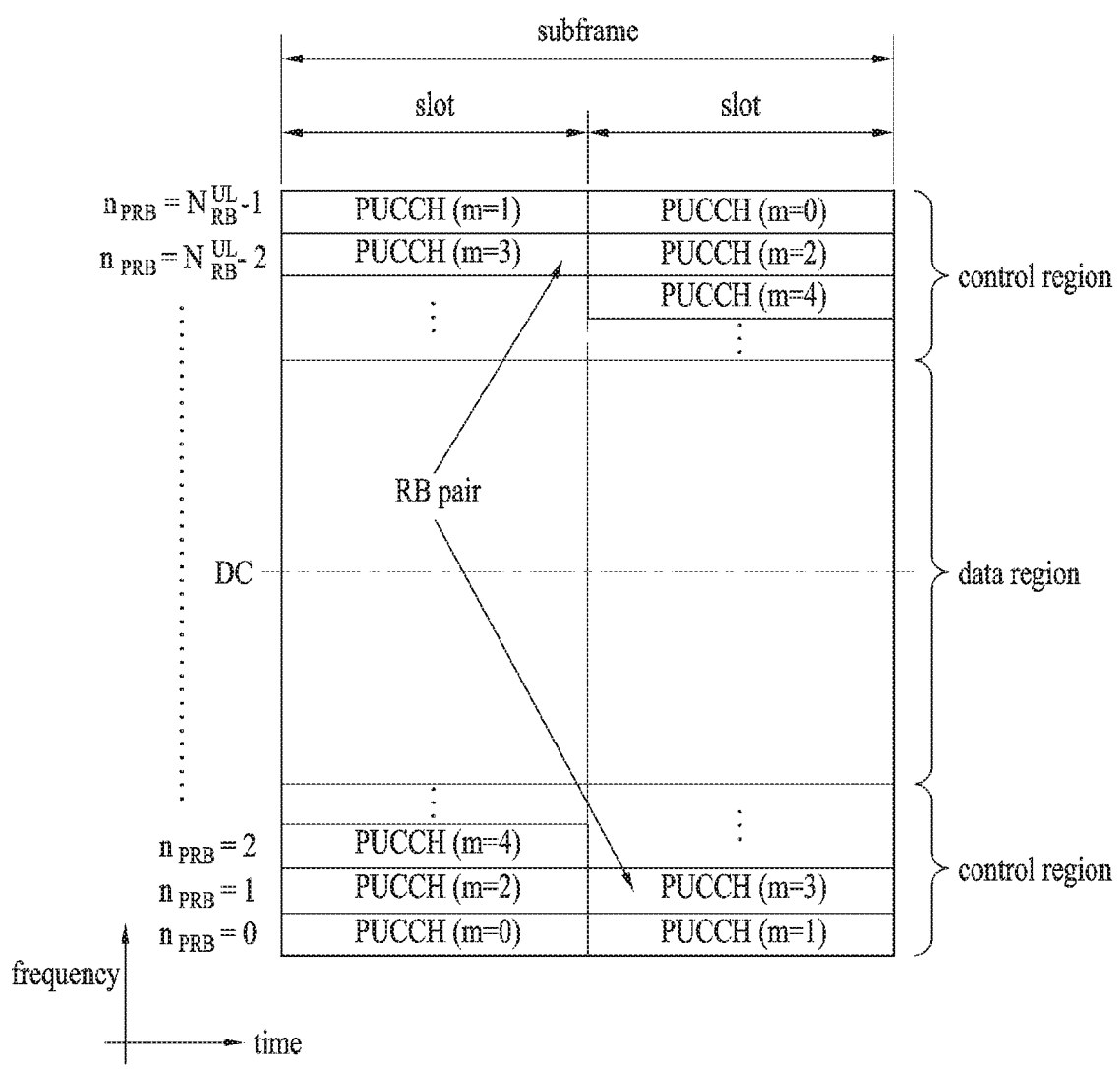
FIG. 4 illustrates a structure of an uplink (UL) subframe used in 3GPP LTE/LTE-A systems.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Figure 5:
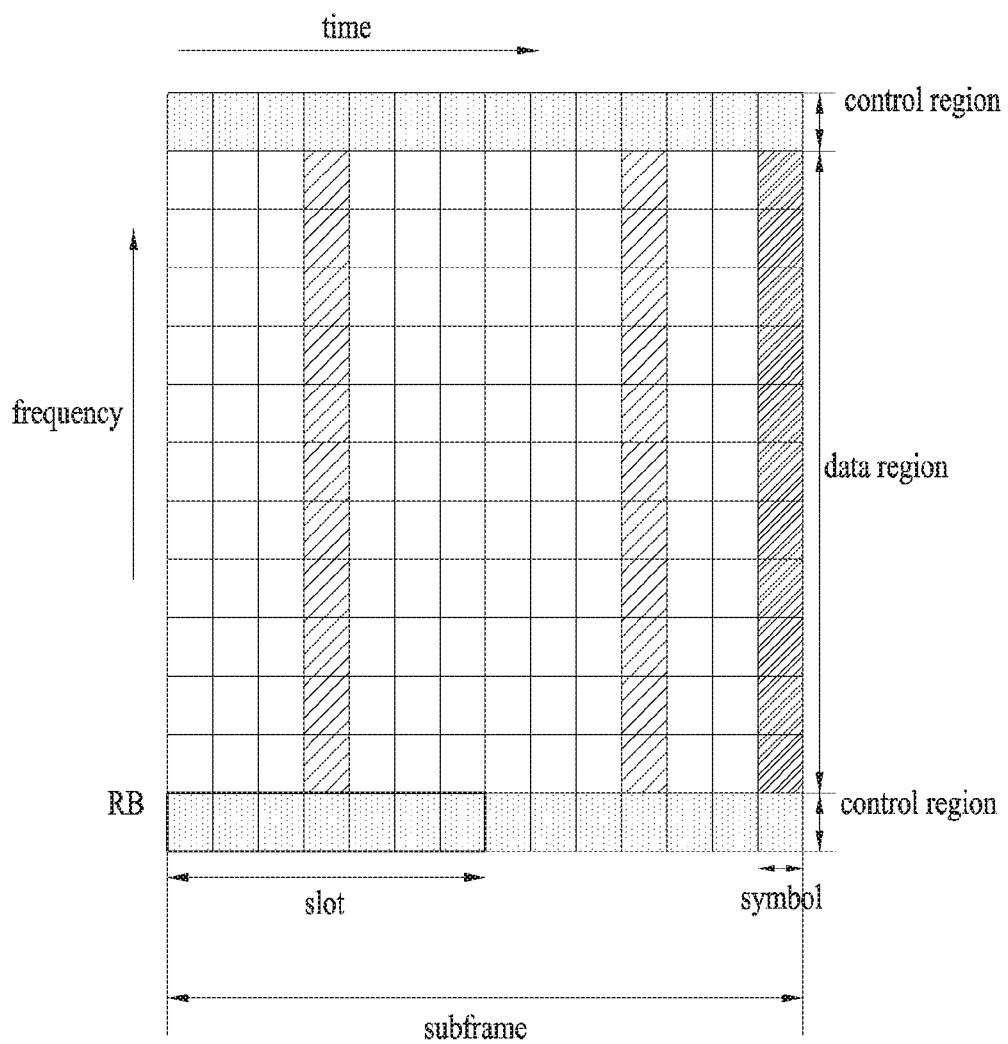
FIG. 5 is a diagram for an example of a reference signal used for an uplink subframe in LTE system.

FIG. 5 is a diagram for an example of a reference signal used for an uplink subframe in LTE system.

Figure 11:
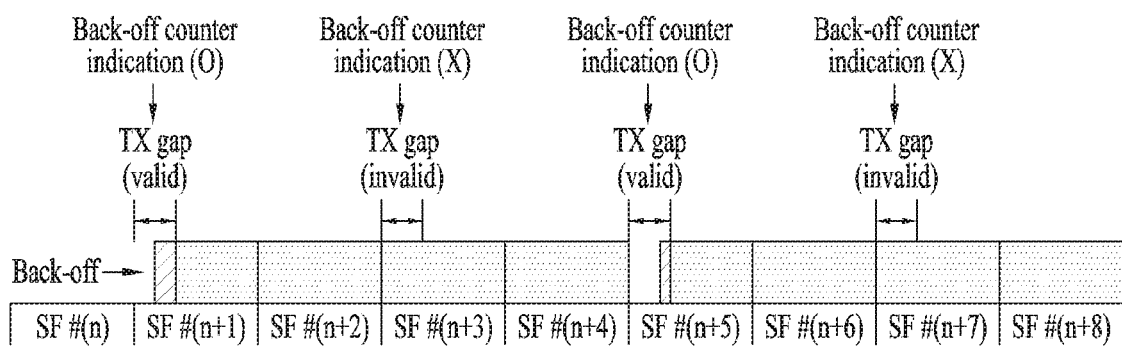
FIG. 11 is a diagram illustrating a data transmission period according to whether or not a backoff counter value is indicated according to a different embodiment of the present invention.

Referring to FIG. 5, a user equipment can periodically or non-periodically transmit an SRS (sounding reference signal) to estimate a channel for an UL band (sub band) except a band on which PUSCH is transmitted or obtain information on a channel corresponding to a whole UL bandwidth (wide band). In case of periodically transmitting the SRS, a period can be determined via an upper layer signal. In case of non-periodically transmitting the SRS, a base station can indicate the transmission of the SRS using an 'SRS request' field of an UL-DL DCI format on PDCCH or trigger the transmission of the SRS using a triggering message. In case of a non-periodic SRS, a user equipment can transmit the SRS only when the SRS is indicated via PDCCH or a triggering message is received. As shown in FIG. 11, a region capable of receiving an SRS in a subframe corresponds to a period at which an SC-FDMA symbol, which is located at the last of a time axis in the subframe, is situated. In case of a TDD special subframe, an SRS can be transmitted via UL period (e.g., UpPTS). In case of a subframe configuration allocating a single symbol to UL period (e.g., UpPTS), an SRS can be transmitted via the last symbol. In case of a subframe configuration allocating 2 symbols, an SRS can be transmitted via the last one or two symbols. SRSs of many user equipments transmitted to the last SC-FDMA of an identical subframe can be distinguished from each other according to a frequency position. Unlike PUSCH, an SRS does not perform DFT (discrete Fourier Transform) calculation used for converting into SC-FDMA and the SRS is transmitted without using a precoding matrix which is used by PUSCH.

Moreover, a region to which a DMRS (demodulation reference signal) is transmitted in a subframe corresponds to a period at which an SC-FDMA symbol, which is located at the center of each slot in a time axis, is situated. Similarly, the DMRS is transmitted via a data transmission band on a frequency axis. For instance, the DMRS is transmitted in a $4^{th}$ SC-FDMA symbol and an $11^{th}$ SC-FDMA symbol in a subframe to which a normal cyclic prefix is applied.

A DMRS can be combined with transmission of PUSCH or PUCCH. An SRS is a reference signal transmitted to a base station by a user equipment for UL scheduling. The base station estimates an UL channel using the received SRS and uses the estimated UL channel for the UL scheduling. The SRS is not combined with the transmission of PUSCH or PUCCH. A basic sequence of an identical type can be used for the DMRS and the SRS. Meanwhile, in case of performing UL multi-antenna transmission, a precoding applied to a DMRS may be identical to a precoding applied to PUSCH.

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 6:
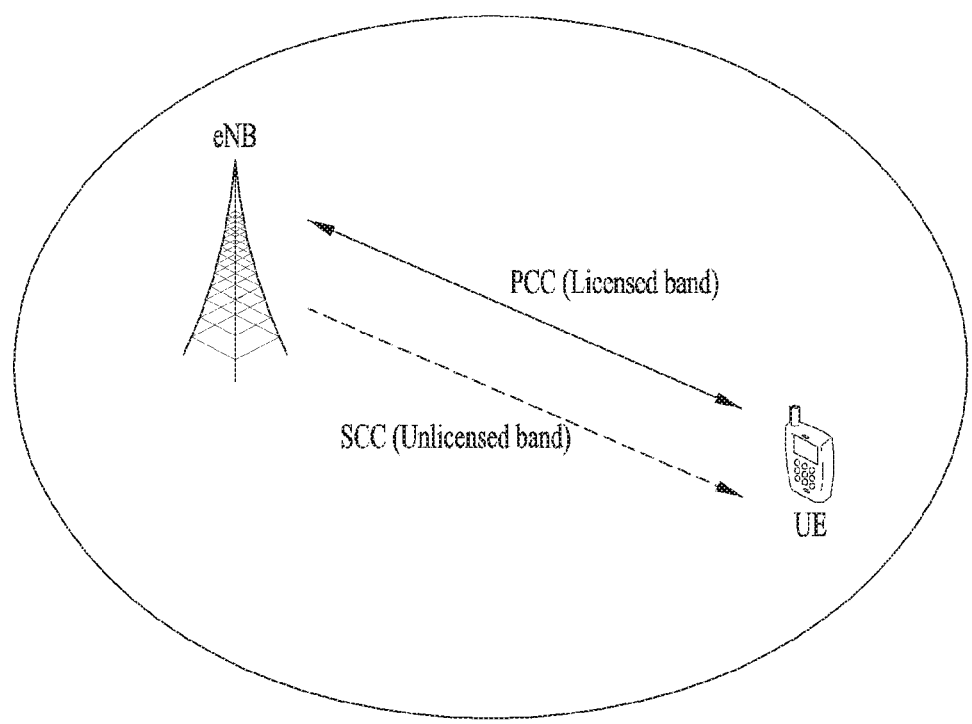
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
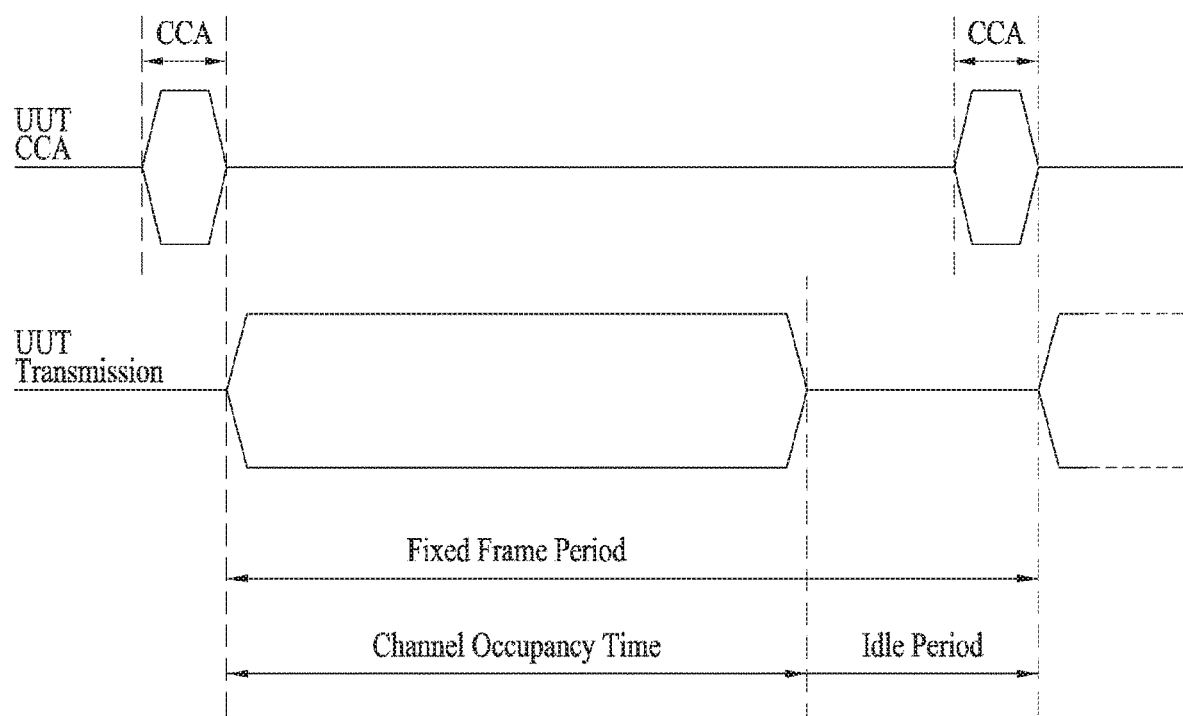
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
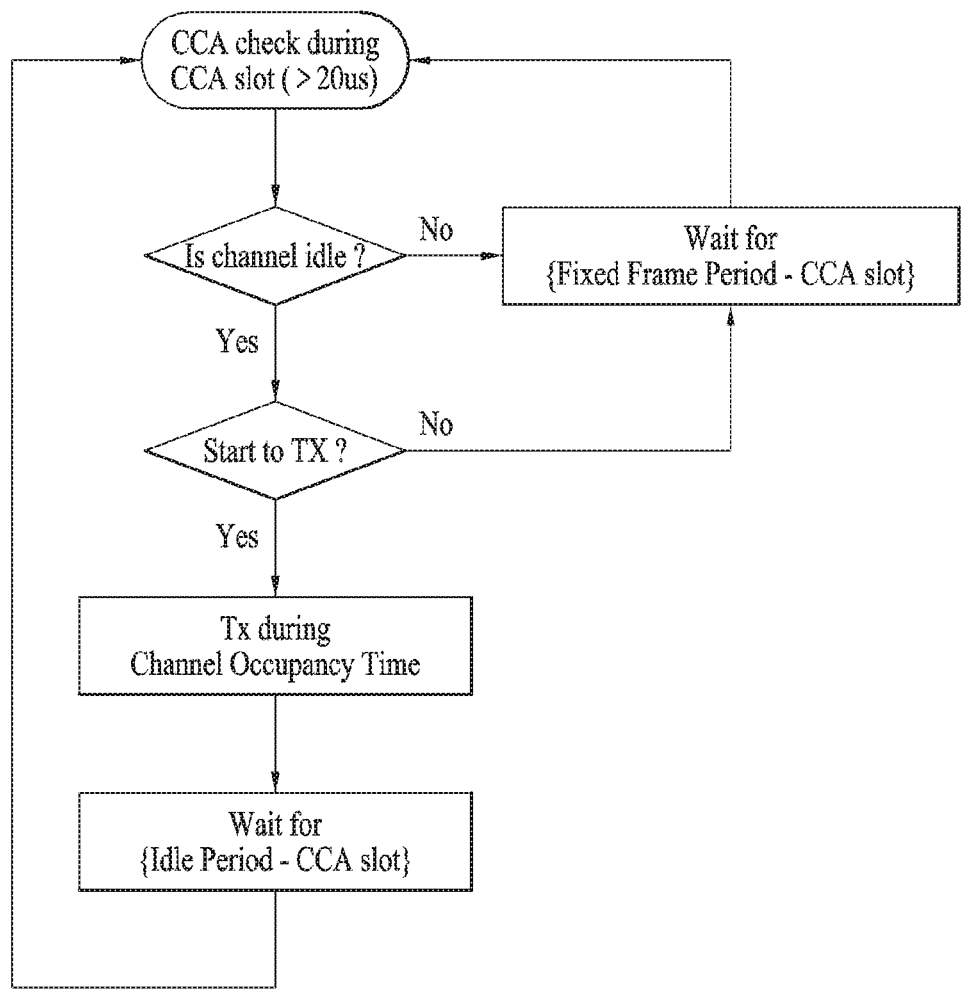
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 9 is a view illustrating an exemplary LBE operation as one of the LBT operations.

Referring to FIG. 9(a), in LBE, the communication node first sets q ($q \in \{4, 5, \ldots, 32\}$) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to $(13/32)q$ ms.

On the contrary, if the channel is occupied in the first CCA slot, the communication node selects N ($N \in \{1, 2, \ldots, q\}$) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to $(13/32)q$ ms.

In the following, the present invention is explained in detail based on the aforementioned description. When a base station or a UE performs an LBT (listen before talk)-based signal transmission in a wireless communication system consisting of the base station and the UE, the present invention proposes a method for the base station to indicate an LBT parameter (e.g., a back-off counter, a length/position of a Tx gap, a max/min contention window size, etc.) for the LBT operation of the UE.

As mentioned in the foregoing description, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing such a cellular network as LTE system on an unlicensed band such as 2.4 GHz or 5 GHz mainly used by Wi-Fi system.

To this end, it is necessary for each communication node to perform LBT (or CS, CCA, etc.) before a signal is transmitted to check that a different communication node does not transmit a signal on a corresponding band, In LTE system, an eNB and a UE should perform LBT to transmit a signal on an unlicensed band. When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, if a signal other than a WiFi signal is received by power equal to or greater than −62 dBm, an STA or an AP does not perform signal transmission in order not to cause any interference.

As mentioned in the foregoing description, it may be difficult to always guarantee downlink transmission of an eNB or uplink transmission of a UE on an unlicensed band, a UE operating in the unlicensed band may maintain access with a different cell operating on a licensed band to stably control mobility, RRM (radio resource management) function, and the like. In this case, as shown in FIG. 6, a scheme of performing data transmission/reception on a licensed band and an unlicensed band is called LAA (licensed assisted access) in general.

In the following, for clarity, a series of signals transmitted by a communication node within a channel occupation time (COT) after an LBT operation is referred to as a TX burst. Among the TX burst, a series of signals consisting of data signals only are referred to as a data burst. The TX burst can include a reservation signal or an initial signal.

Figure 10:
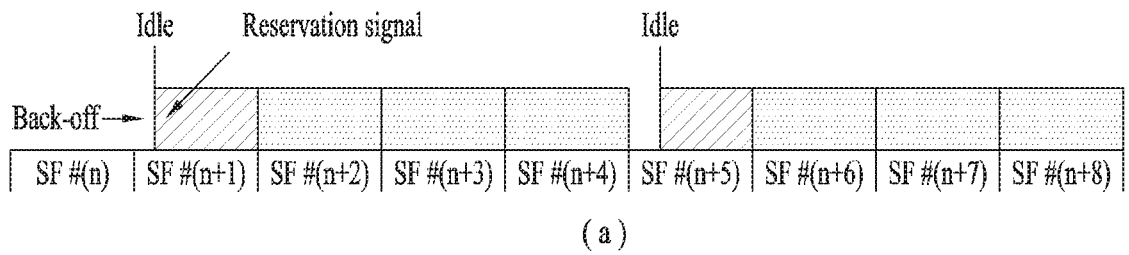
FIG. 10 is a diagram illustrating an effect of a data transmission method according to one embodiment of the present invention.

FIG. 10 is a diagram illustrating an effect of a data transmission method according to one embodiment of the present invention.

As shown in FIG. 10 (a), for clarity, an LAA-based wireless communication system reuses a transmission scheme of LTE system and transmits a DL signal or a UL signal using a subframe as a basic transmission unit. In this case, it may set restriction on a communication node of the LAA system to perform the start and the end of a data burst transmission at a subframe boundary all the time. Yet, when the communication node performs an LBT operation including a back-off operation, in order for the communication node to resume transmission of a different signal after transmission of a specific data burst is completed, the communication node should perform the LBT operation again. Hence, it is highly probable that the transmission of the different signal is available from a point rather than a subframe boundary of a specific subframe. In this case, due to the abovementioned restriction, the communication node is unable to utilize a subframe capable of transmitting a signal in a partial period only for data transmission and uses the subframe for transmitting a reservation signal only.

In order to solve the problem, the present invention proposes a method of separately designating a time period capable of transmitting data in a specific subframe and a method for a communication node to transmit data during the time period capable of transmitting data only. In other word, the present invention proposes a method of separately designating a period during which data transmission is not permitted in a specific subframe and a method for a communication node not to transmit data during the period.

In the present invention, a period during which data transmission is not permitted in a specific subframe is referred to as a transmission gap (Tx gap). In a part of embodiments of the present invention, a communication node may perform an LBT operation in the Tx gap.

FIG. 10 (b) shows a case that a Tx gap is configured by N number of OFDM symbols positioned at a fore part of a first subframe at which data burst starts. As shown in FIGS. 10 (a) and 10 (b), if a period capable of transmitting data transmitted by a communication node is designated in a specific subframe, the communication node can more efficiently transmit the data.

In order to efficiently utilize a radio resource in a wireless communication system supporting LAA, it is preferable to support simultaneous transmission such as MU-MIMO (multi user-multi input multi output) of a plurality of UEs or FDM (frequency division multiplexing) when UL transmission is performed in an unlicensed band. In this case, when a UE performs an LBT operation including a back-off operation, in order to support simultaneous transmission of a plurality of UEs, it is necessary to perform an operation of identically configuring back-off counter values of a plurality of the UEs performing the simultaneous transmission at specific timing. As a method of solving the problem, a base station may manage a back-off operation for UL transmission. To this end, for example, the base station can indicate a UE to configure a specific back-off counter value by including the back-off counter value in a UL grant indicating PUSCH transmission.

Unlike DL transmission, since a UE corresponding to a communication node is unable to autonomously determine whether to transmit a signal in UL transmission and follows a UL grant transmitted by the base station, it is difficult for the UE to know the start timing and the end timing of a data burst. Hence, it is preferable that the base station also manages a data transmission period for UL transmission and existence and nonexistence of a Tx gap for setting restriction on data transmission.

In this case, it may be preferable that the data transmission period for UL transmission and the Tx gap for setting restriction on data transmission have a different length and a position according to whether a subframe appearing after a UL subframe corresponds to a UL subframe or a DL subframe In the following, as a method of configuring a period capable of transmitting data by a communication node in a specific subframe, it may consider both a method of providing information on a 'data transmission period' capable of transmitting data by the communication node and a method of providing information on a 'transmission gap (Tx gap)' incapable of transmitting data by the communication node. In particular, a configuration that a base station provides the information on 'data transmission period' for a specific subframe can be extensively applied to a configuration that the base station provides information on 'Tx gap' for the specific subframe.

The present invention proposes a category 4 (hereinafter, Cat.4) UL LBT operation, which is similar to a Cat.4 DL LBT operation proposed by LTE Rel-13 system as a DL LBT operation, as an LBT operation for transmitting UL signal transmitted by a UE.

For reference, as shown in Table 5 in the following, an LBT parameter for the Cat.4 DL LBT proposed by LTE Rel-13 system includes a defer period length, a max/min contention window size (CWS), maximum channel occupancy time (MCOT), etc. according to a class for the total 4 channel access priority classes. A base station performs random back-off by utilizing LBT parameters determined by the channel access priority class. If channel access is performed after the random back-off is completed, it may be able to perform signal transmission within the maximum channel occupancy time (MCOT). For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where a different RAT (radio access technology) such as Wi-Fi does not exists (e.g., a region where a regulation or a rule for the use of frequency (within an unlicensed band) guarantees that there is no other RAT such as Wi-Fi, and the like.).

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the aspect of the abovementioned description, the present invention proposes a method for a base station to support a UL signal transmission of a UE. In the following, an operation in LTE system is explained as a specific embodiment of the present invention. Yet, the operation of the present invention can be extensively applied to a random wireless communication system that performs an LBT operation.

In the following description, a configuration of each embodiment of the present invention is limitedly explained. Yet, not opposing embodiments can be applied in a manner of being overlapped with each other. For example, [proposed method #1], [proposed method #8], and [proposed method #10] can be applied in a manner of being overlapped with each other.

According to the present invention, a UE transmitting data in an unlicensed band receives LBT type information and information on a UL data transmission period during which data is transmitted in one subframe. The UE can transmit the data to the base station during the UL data transmission period only within the subframe based on an LBT operation indicated by the LBT type information.

In this case, the information on the UL data transmission period can include starting position information on a starting position at which the data is transmitted in the subframe. In addition, the information on the UL data transmission period can include transmission gap configuration information indicating that the transmission of the data is restricted in the N (N is an integer equal to or greater than 0) number of contiguous symbols including the last symbol in time domain among a plurality of symbols included in the subframe.

If an SRS symbol in which an SRS (sounding reference signal) is transmitted is not included in the UL data transmission period, the UE can abandon SRS transmission in the subframe.

In the following, a plurality of methods proposed by the present invention are explained in detail.

[Proposed Method #1]

A bit field including N number of bits is included in dynamic signaling (or a UL grant indicating PUSCH transmission) signaled to a UE by a base station and one of $2^N$ number of states represented by the N number of bits indicates a {LBT type, LBT parameter} combination. Yet, the LBT type and the LBT parameter can be configured by one selected from the following via higher layer signaling (in this case, N corresponds to an integer).

The information on the LBT type can be configured as follows.

(1) (Before PUSCH is transmitted) No LBT
(2) (Before PUSCH is transmitted) short duration CCA (PUSCH is transmitted according to a CCA result)
(3) (Before PUSCH is transmitted) Back-off based LBT The information on the LBT parameter can be configured as follows.

(1) N/A
(2) Short duration length (corresponding to short duration in LBT type (2))
(3) Back-off counter value
(4) LBT starting position (on the basis of PUSCH transmission timing)

Yet, a part of the LBT type and the LBT parameter can be implicitly forwarded to a UE in a manner of being corresponded to specific CRC masking or an RS sequence.

For reference, LBT for PUSCH transmission can be differently configured according to a regulation of each region. For example, in a specific region or a country, if PUSCH transmission exists within short time from PDSCH transmission, it may permit a UE to transmit PUSCH without a separate LBT transmission. Or, similar to FBE of Europe regulation, it may be able to configure the UE to transmit PUSCH by performing CCA on a single CCA slot only with a prescribed frame interval. Or, similar to LBE, it may be able to configure the UE to perform a back-off based LBT. In particular, in order to support an LAA operation in various regions, it is necessary for the UE to perform various LBT operations. Hence, the present invention proposes a method of managing an LBT operation of a UE for PUSCH transmission in a manner that a base station sets combinations of an LBT type and an LBT parameter corresponding to the LBT type to the UE in advance and indicates one of the combinations to the UE.

More specifically, information described in the following can be utilized as the LBT type information and the LBT parameter information.

(1) LBT type (25 us LBT or UL category 4 LBT (hereinafter, Cat.4 LBT))
(2) In case of Cat.4 LBT, indicate one of among LBT priority class 1, 2, 3, and 4
(3) Starting position of UL data transmission period (e.g., PUSCH start position)
   A. (SC-FDMA) symbol 0 (applied to both 25 us LBT and Cat.4 LBT)
   B. (SC-FDMA) symbol 1 (applied to both 25 us LBT and Cat.4 LBT)
   C. Timing after 25 us from timing at which (SC-FDMA) symbol 0 starts (applied to 25 us LBT only)
   D. Timing after 25 us+TA (timing advance) from timing at which (SC-FDMA) symbol 0 starts (applied to 25 us LBT only)

Specifically, among the LBT type, the 25 us LBT corresponds to an LBT operation that performs PUSCH transmission according to a CCA result after CCA is performed during 25 us before PUSCH is transmitted. The Cat.4 LBT, which is applied in UL, follows an algorithm identical to an algorithm of a DL Cat.4 LBT. In this case, LBT priority class, a contention window size, and the like can be uniquely set to UL LBT.

Information on a start position of a UL data transmission period during which a UE can transmit data can indicate one selected from the group consisting of a start point of a symbol #0 of a subframe in which the UE transmits data, a start point of a symbol #1 of the subframe in which the UE transmits data, timing after 25 us from the start point of the symbol #0 of the subframe, and timing after 25 us+TA (timing advance) applied to the UE from the start point of the symbol #0 of the subframe. In this case, the subframe can include symbols ranging from #0 to #13.

In this case, information on a PUSCH start position can be signaled in a manner of being distinguished from information on an LBT type. In particular, the information on the PUSCH start position can be delivered via a DCI format 0A/4A/0B/4B.

In the following, in order to more efficiently transmit information on an LBT type, an LBT priority class, and a PUSCH start position, the present invention proposes a method of performing joint coding on the information.

Joint Coding Example #1

As an example of performing joint coding on the information on an LBT type, an LBT priority class, and a PUSCH start position, a base station (e.g., eNB) can indicate the aforementioned 4 PUSCH start positions. In this case, if an LBT type for a specific state of joint coding corresponds to Cat.4, the specific state can include information on the LBT priority class and the information on the PUSCH start position. And, if the LBT type for the specific state of joint coding corresponds to 25 us LBT, the specific state can include information on the PUSCH start position only.

TABLE 6

| State | LBT type, [LBT priority class], PUSCH starting position |
|---|---|
| 0 | Cat.4, priority class = 1, symbol 0 start |
| 1 | Cat.4, priority class = 1, symbol 1 start |
| 2 | Cat.4, priority class = 2, symbol 0 start |
| 3 | Cat.4, priority class = 2, symbol 1 start |
| 4 | Cat.4, priority class = 3, symbol 0 start |
| 5 | Cat.4, priority class = 3, symbol 1 start |
| 6 | Cat.4, priority class = 4, symbol 0 start |
| 7 | Cat.4, priority class = 4, symbol 1 start |
| 8 | 25 us LBT, symbol 0 start |
| 9 | 25 us LBT, symbol 1 start |
| 10 | 25 us LBT, symbol 0 + 25 us start |
| 11 | 25 us LBT, symbol 0 + 25 us + TA start |

In Table 6, 'symbol 0+25 us start' corresponds to a case that PUSCH transmission is performed after 25 us from timing at which (SC-FDMA) symbol 0 starts. '25 us LBT, symbol 0+25 us+TA start' corresponds to a case that PUSCH transmission is performed after 25 us+TA from timing at which (SC-FDMA) symbol 0 starts.

Joint Coding Example #2

As an example of performing joint coding on the information on the LBT type and the LBT priority class, a base station can indicate whether a PUSCH start position corresponds to an (SC-FDMA) symbol 0 or 1 through separate 1 bit information. In this case, if the base station indicates that the PUSCH start position corresponds to the (SC-FDMA) symbol 1, a UE can transmit a reservation signal and the like at the timing after 25 us or 25 us+TA from the timing at which the (SC-FDMA) symbol 0 starts. In the abovementioned example, if an LBT type of a specific state of the joint coding corresponds to Cat.4 LBT, the specific state includes information on LBT priority class as well. Or, if the LBT type of a specific state of the joint coding corresponds to 25 us LBT, the specific state may not include any separate information.

TABLE 7

| State | LBT type, [LBT priority class] |
|---|---|
| 0 | Cat.4, priority class = 1 |
| 1 | Cat.4, priority class = 2 |
| 2 | Cat.4, priority class = 3 |
| 3 | Cat.4, priority class = 4 |
| 4 | 25 us LBT |

TABLE 8

| State | PUSCH starting position |
|---|---|
| 0 | symbol 0 |
| 1 | symbol 1 |

Meanwhile, in UL LBT proposed by the present invention, LBT parameters of the Cat.4 LBT can be configured as follows according to each of the LBT priority classes.

TABLE 9

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Among the maximum channel occupancy time (MCOT) of the LBT priority class ¾, 6 ms can be increased to 8 ms by adding one or more gaps. A minimum period of pause may become 100 us. The maximum channel occupancy time (MCOT) may become 6 ms before the gap is added. The gap duration is not included in channel occupancy time.

In environment where a different RAT (radio access technology) sharing a carrier does not exists (e.g., a region where a regulation or a rule for the use of frequency (within an unlicensed band) guarantees that there is no other RAT such as Wi-Fi, and the like), the maximum channel occupancy time (MCOT) of the LBT priority class ¾ can be configured by 10 ms. Otherwise, the maximum channel occupancy time (MCOT) of the LBT priority class ¾ can be configured by 6 ms.

Joint Coding Example #3

Rel-14 eLAA is considering a method that a base station informs a UE of location information of a UL subframe in which ACK firstly occurs in a UL transmission burst most recently received by the base station for contention widow size adaptation. The information can be indicated through a UL grant. If a subframe in which the UL grant is transmitted corresponds to an $n^{th}$ subframe, the base station can inform the UE of the location information of the UL subframe in which the ACK firstly occurs in the UL transmission burst most recently received by the base station among UL subframes prior to an $(n-k)^{th}$ subframe by indicating an m value corresponding to a time offset value or a subframe offset value. In particular, the base station can indicate the UE that the base station has determined $(n-m)^{th}$ subframe or $(n-k-m)^{th}$ subframe (e.g., k=4) as the UL subframe in which the ACK firstly occurs in the UL transmission burst most recently received by the base station using the m value. The information corresponds to information necessary for the Cat.4 LBT only. Joint coding can be performed on the information together with the information on the LBT type, the LBT priority class, the PUSCH start position, and the like. Table 10 in the following shows a case that joint coding is performed on the LBT type, the LBT priority class, the PUSCH start position, and the location information of ACK subframe.

TABLE 10

| State | LBT type, [LBT priority class], PUSCH starting position, ACK SF position |
|---|---|
| 0 | Cat.4, priority class = 1, symbol 0 start, none |
| 1 | Cat.4, priority class = 1, symbol 0 start, −4 |
| 2 | Cat.4, priority class = 1, symbol 0 start, −5 |
| ... | ... |
| 30 | Cat.4, priority class = 1, symbol 0 start, −33 |
| 31 | Cat.4, priority class = 1, symbol 1 start, none |
| 32 | Cat.4, priority class = 1, symbol 1 start, −4 |
| 33 | Cat.4, priority class = 1, symbol 1 start, −5 |
| ... | ... |
| 60 | Cat.4, priority class = 1, symbol 1 start, −33 |
| 61 | Cat.4, priority class = 2, symbol 0 start, none |
| 62 | Cat.4, priority class = 2, symbol 0 start, −4 |
| 63 | Cat.4, priority class = 2, symbol 0 start, −5 |
| ... | ... |
| 90 | Cat.4, priority class = 2, symbol 0 start, −33 |
| 91 | Cat.4, priority class = 2, symbol 1 start, none |
| 92 | Cat.4, priority class = 2, symbol 1 start, −4 |
| 93 | Cat.4, priority class = 2, symbol 1 start, −5 |
| ... | ... |
| 120 | Cat.4, priority class = 2, symbol 1 start, −33 |
| 121 | Cat.4, priority class = 3, symbol 0 start, none |
| 122 | Cat.4, priority class = 3, symbol 0 start, −4 |
| 123 | Cat.4, priority class = 3, symbol 0 start, −5 |
| ... | ... |
| 150 | Cat.4, priority class = 3, symbol 0 start, −33 |
| 151 | Cat.4, priority class = 3, symbol 1 start, none |
| 152 | Cat.4, priority class = 3, symbol 1 start, −4 |
| 153 | Cat.4, priority class = 3, symbol 1 start, −5 |
| ... | ... |
| 180 | Cat.4, priority class = 3, symbol 1 start, −33 |
| 181 | Cat.4, priority class = 4, symbol 0 start, none |
| 182 | Cat.4, priority class = 4, symbol 0 start, −4 |
| 183 | Cat.4, priority class = 4, symbol 0 start, −5 |
| ... | ... |
| 210 | Cat.4, priority class = 4, symbol 0 start, −33 |
| 211 | Cat.4, priority class = 4, symbol 1 start, none |
| 212 | Cat.4, priority class = 4, symbol 1 start, −4 |
| 213 | Cat.4, priority class = 4, symbol 1 start, −5 |
| ... | ... |
| 240 | Cat.4, priority class = 4, symbol 1 start, −33 |
| 241 | 25 us LBT, symbol 0 start |
| 242 | 25 us LBT, symbol 1 start |
| 243 | 25 us LBT, symbol 0 + 25 us start |
| 244 | 25 us LBT, symbol 0 + 25 us + TA start |
| 245 | Reserved |
| 246 | Reserved |
| ... | ... |
| 255 | Reserved |

In Table 10, signaling for LBT parameter and contention widow adaptation can be represented by a size of 8 bits. In this case, if a time offset (or, a subframe offset) for an ACK subframe corresponds to 'none', it indicates that the base station fails to discover the ACK subframe in a region capable of being indicated by a UL grant.

Joint Coding Example #4

Rel-14 eLAA is considering a method that a base station directly indicates a contention window size to a UE for contention window size adaptation. The information corresponds to information necessary for the Cat.4 LBT only. Joint coding can be performed on the information together with the information on the LBT type, the LBT priority class, the PUSCH start position, and the like. Table 11 in the following shows a case that joint coding is performed on the LBT type, the LBT priority class, the PUSCH start position, and the contention window size.

TABLE 11

| State | LBT type, [LBT priority class], PUSCH starting position, CW size |
|---|---|
| 0 | Cat.4, priority class = 1, symbol 0 start, 3 |
| 1 | Cat.4, priority class = 1, symbol 0 start, 7 |
| 2 | Cat.4, priority class = 1, symbol 1 start, 3 |
| 3 | Cat.4, priority class = 1, symbol 1 start, 7 |
| 4 | Cat.4, priority class = 2, symbol 0 start, 7 |
| 5 | Cat.4, priority class = 2, symbol 0 start, 15 |
| 6 | Cat.4, priority class = 2, symbol 1 start, 7 |
| 7 | Cat.4, priority class = 2, symbol 1 start, 15 |
| 8 | Cat.4, priority class = 3, symbol 0 start, 15 |
| 9 | Cat.4, priority class = 3, symbol 0 start, 31 |
| 10 | Cat.4, priority class = 3, symbol 0 start, 63 |
| 11 | Cat.4, priority class = 3, symbol 0 start, 127 |
| 12 | Cat.4, priority class = 3, symbol 0 start, 255 |
| 13 | Cat.4, priority class = 3, symbol 0 start, 511 |
| 14 | Cat.4, priority class = 3, symbol 0 start, 1023 |
| 15 | Cat.4, priority class = 3, symbol 1 start, 15 |
| 16 | Cat.4, priority class = 3, symbol 1 start, 31 |
| 17 | Cat.4, priority class = 3, symbol 1 start, 63 |
| 18 | Cat.4, priority class = 3, symbol 1 start, 127 |
| 19 | Cat.4, priority class = 3, symbol 1 start, 255 |
| 20 | Cat.4, priority class = 3, symbol 1 start, 511 |
| 21 | Cat.4, priority class = 3, symbol 1 start, 1023 |
| 22 | Cat.4, priority class = 4, symbol 0 start, 15 |
| 23 | Cat.4, priority class = 4, symbol 0 start, 31 |
| 24 | Cat.4, priority class = 4, symbol 0 start, 63 |
| 25 | Cat.4, priority class = 4, symbol 0 start, 127 |
| 26 | Cat.4, priority class = 4, symbol 0 start, 255 |
| 27 | Cat.4, priority class = 4, symbol 0 start, 511 |
| 28 | Cat.4, priority class = 4, symbol 0 start, 1023 |
| 29 | Cat.4, priority class = 4, symbol 1 start, 15 |
| 30 | Cat.4, priority class = 4, symbol 1 start, 31 |
| 31 | Cat.4, priority class = 4, symbol 1 start, 63 |
| 32 | Cat.4, priority class = 4, symbol 1 start, 127 |
| 33 | Cat.4, priority class = 4, symbol 1 start, 255 |
| 34 | Cat.4, priority class = 4, symbol 1 start, 511 |
| 35 | Cat.4, priority class = 4, symbol 1 start, 1023 |
| 36 | 25 us LBT, symbol 0 start |
| 37 | 25 us LBT, symbol 1 start |
| 38 | 25 us LBT, symbol 0 + 25 us start |
| 39 | 25 us LBT, symbol 0 + 25 us + TA start |
| 40 | Reserved |
| 41 | Reserved |
| ... | ... |
| 63 | Reserved |

In Table 11, signaling for LBT parameter and contention widow adaptation can be represented by a size of 6 bits.

Joint Coding Example #5

Rel-14 eLAA is considering a method that a base station indicates a HARQ process index of a subframe in which ACK is firstly detected in a previous UL transmission burst to a UE for contention window size adaptation. The information corresponds to information necessary for the Cat.4 LBT only. Joint coding can be performed on the information together with the information on the LBT type, the LBT priority class, the PUSCH start position, and the like. Table 12 in the following shows a case that joint coding is performed on the LBT type, the LBT priority class, the PUSCH start position, and HARQ process ID information.

TABLE 12

| State | LBT type, [LBT priority class], PUSCH starting position, HARQ process ID |
|---|---|
| 0(#) | Cat.4, priority class = 1, symbol 0 start, none |
| 1 | Cat.4, priority class = 1, symbol 0 start, 0 |
| 2 | Cat.4, priority class = 1, symbol 0 start, 1 |
| ... | ... |
| 16 | Cat.4, priority class = 1, symbol 0 start, 15 |
| 17(#) | Cat.4, priority class = 1, symbol 1 start, none |
| 18 | Cat.4, priority class = 1, symbol 1 start, 0 |
| 19 | Cat.4, priority class = 1, symbol 1 start, 1 |
| ... | ... |
| 32 | Cat.4, priority class = 1, symbol 1 start, 15 |
| 33(#) | Cat.4, priority class = 2, symbol 0 start, none |
| 34 | Cat.4, priority class = 2, symbol 0 start, 0 |
| 35 | Cat.4, priority class = 2, symbol 0 start, 1 |
| ... | ... |
| 48 | Cat.4, priority class = 2, symbol 0 start, 15 |
| 49(#) | Cat.4, priority class = 2, symbol 1 start, none |
| 50 | Cat.4, priority class = 2, symbol 1 start, 0 |
| 51 | Cat.4, priority class = 2, symbol 1 start, 1 |
| ... | ... |
| 64 | Cat.4, priority class = 2, symbol 1 start, 15 |
| 65(#) | Cat.4, priority class = 3, symbol 0 start, none |
| 66 | Cat.4, priority class = 3, symbol 0 start, 0 |
| 67 | Cat.4, priority class = 3, symbol 0 start, 1 |
| ... | ... |
| 80 | Cat.4, priority class = 3, symbol 0 start, 15 |
| 81(#) | Cat.4, priority class = 3, symbol 1 start, none |
| 82 | Cat.4, priority class = 3, symbol 1 start, 0 |
| 83 | Cat.4, priority class = 3, symbol 1 start, 1 |
| ... | ... |
| 96 | Cat.4, priority class = 3, symbol 1 start, 15 |
| 97(#) | Cat.4, priority class = 4, symbol 0 start, none |
| 98 | Cat.4, priority class = 4, symbol 0 start, 0 |
| 99 | Cat.4, priority class = 4, symbol 0 start, 1 |
| ... | ... |
| 112 | Cat.4, priority class = 4, symbol 0 start, 15 |
| 113(#) | Cat.4, priority class = 4, symbol 1 start, none |
| 114 | Cat.4, priority class = 4, symbol 1 start, 0 |
| 115 | Cat.4, priority class = 4, symbol 1 start, 1 |
| ... | ... |
| 128 | Cat.4, priority class = 4, symbol 1 start, 15 |
| 129 | 25 us LBT, symbol 0 start |
| 130 | 25 us LBT, symbol 1 start |
| 131 | 25 us LBT, symbol 0 + 25 us start |
| 132 | 25 us LBT, symbol 0 + 25 us + TA start |
| 133 | Reserved |
| 134 | Reserved |
| ... | ... |
| 255 | Reserved |

In Table 12, signaling for LBT parameter and contention widow adaptation can be represented by a size of 8 bits. In the example, if the HARQ process ID corresponds to 'none', a code point may or may not exist. For example, if the code point does not exist, 8 code points (represented by #) are excluded from the total 133 code points. In particular, the total 125 code points can be represented by a size of 7 bits. And, if the HARQ process ID corresponds to 'none', it means that a base station fails to discover an ACK subframe in a region capable of being indicated by a UL grant. In this case, a UE can maintain or initialize a contention window size.

[Proposed Method #2]

When a bit field including N number of bits is included in dynamic signaling (or a UL grant indicating PUSCH transmission) signaled to a UE by a base station and an LBT type or an LBT parameter is indicated via the bit field, it may be able to configure a state represented by the bit field to indicate an LBT operation autonomously performed by the UE. The LBT operation autonomously performed by the UE corresponds to an operation of performing LBT in a manner that the UE autonomously determines the timing at which LBT is performed and an LBT parameter when there is UL data to be transmitted by the UE.

When UL transmission is performed in LAA-based wireless communication system, in order to permit simultaneous transmission of a plurality of UEs, it is profitable that a base station manages LBT parameter of a UE. On the other hand, when there is a single UE to perform UL transmission, if the base station manages LBT parameter of the UE, it is inefficient. For example, assume that the UE has continuously received UL transmission indication for 2 subframes. In this case, if the UE autonomously manages a back-off counter, although UL transmission is failed in a first subframe, since the back-off counter is consumed in the first subframe, a transmission probability in a second subframe can be enhanced. On the contrary, if the base station indicates the back-off counter, although the UE fails to perform UL transmission in the first subframe and the back-off counter is partly decreased (consumed), the base station can configure the back-off counter to be initialized again irrespective of the legacy backoff counter value partly decreased (consumed) by the UE when UL transmission is performed in the second subframe. In this case, a UL transmission probability can be lowered compared to a case that the UE autonomously performs LBT. Hence, the present invention proposes a method for the base station to indicate the UE to autonomously perform an LBT operation via a UL grant or dynamic signaling in consideration of a case that a UL transmission target corresponds to a single UE.

[Proposed Method #3]

When a UE applies LBT including a back-off operation to transmit PUSCH, LBT start timing can be controlled according to whether or not a back-off counter value is indicated by a base station.

(1) When a back-off counter value (for transmitting PUSCH in an $n^{th}$ subframe) is indicated, A. if there is dynamic signaling of a base station indicating LBT start timing, i. start LBT operation at corresponding timing B. if there is no dynamic signaling of a base station indicating LBT start timing, i. start LBT at a Tx gap immediately before PUSCH is transmitted in an $n^{th}$ subframe ii. start LBT at timing preceding as much as $T_{LBT}$ from timing of transmitting PUSCH in an $n^{th}$ subframe 1. $T_{LBT}$ is determined by a function of a back-off counter value selected by a UE.

2. A base station can set $T_{LBT}$ to a UE via higher layer.

3. A base station can set $T_{LBT}$ to a UE via dynamic signaling using a value selected from among a plurality of values (configured via higher layer signaling).

(2) When a back-off counter value (for transmitting PUSCH in an $n^{th}$ subframe) is not indicated, A. follow UE implementation B. start LBT immediately after UL scheduling C. start LBT at timing preceding as much as $T_{LBT}$ from timing of transmitting PUSCH in an $n^{th}$ subframe i. $T_{LBT}$ is determined by a function of a back-off counter value selected by a UE.

ii. A base station can set $T_{LBT}$ to a UE via higher layer.

iii. A base station can set $T_{LBT}$ to a UE via dynamic signaling using a value selected from among a plurality of values (configured via higher layer signaling).

As mentioned in the foregoing description, when UL transmission is performed in LAA-based wireless communication system, in order to permit simultaneous transmission of a plurality of UEs, it is profitable that a base station manages an LBT parameter of a UE. When LBT including a back-off operation is applied to UL transmission, it may be able to increase a simultaneous transmission probability only when a plurality of UEs have the same LBT parameter (e.g., a back-off counter) at the same timing. Hence, when the base station intends to indicate the simultaneous transmission of a plurality of the UEs, it is necessary for the base station to inform the UEs of LBT start timing as well as a back-off counter value. Hence, when separate dynamic signaling for indicating LBT start timing does not exist, the present invention proposes a method of starting an LBT operation at a predetermined LBT start timing according to whether or not the back-off counter value is indicated.

In this case, when such a PUSCH transmitted without a UL grant as SPS (semi-persistent scheduling) PUSCH is transmitted or, as mentioned earlier in [Proposed method #2], when the leadership of an LBT operation is provided to a UE, a UE operation can be separately defined for a case that indication for a back-off counter value is not received. For example, a corresponding configuration may follow UE implementation or can configure LBT to be started at the timing preceding as much as TLBT from the timing at which PUSCH is transmitted.

[Proposed Method #4]

When a UE applies LBT including a back-off operation to transmit PUSCH, a base station can indicate an order of an LBT operation (or whether or not an initial CCA is performed) via higher layer signaling or dynamic signaling as follows.

(1) Perform initial CCA first (at LBT start timing predetermined for specific PUSCH transmission)

(2) Perform back-off operation after CCA is performed on a defer period (at LBT start timing predetermined for specific PUSCH transmission)

(3) If a back-off counter value is indicated via a UL grant, (1) or (2) of the [Proposed method #4] is performed when PUSCH is transmitted in response to the UL grant When a UE performs an LBT operation including a back-off operation according to an indication of a base station, if a back-off counter value is indicated to the UE from the base station, it is necessary for the UE to consider an order of the LBT operation. For example, if the base station configures the back-off counter value of the UE, it may be able to configure initial CCA to be always performed immediately before PUSCH is transmitted. However, according to a regulation of a specific region, since a channel can be determined as idle immediately after the initial CCA, the PUSCH transmission can be regarded as an aggressive channel access scheme. In particular, if the base station configures the back-off counter value of the UE, a defer period and a back-off operation are performed in the specific region. The initial CCA can be permitted only when the UE leads the LBT operation.

[Proposed Method #5]

If the UE drops PUSCH transmission (in an $n^{th}$ subframe) due to the failure in accessing a channel according to the LBT operation and there exists PUSCH to be transmitted (in an $(n+1)^{th}$ subframe), the UE may operate as follows according to whether or not a back-off counter value (for the PUSCH to be transmitted in the $(n+1)^{th}$ subframe) is indicated by the base station.

(1) If there is data to be transmitted and the back-off counter value is indicated by the base station, A. As mentioned earlier in [Proposed method #3] and [Proposed method #4], perform LBT according to the indication of the base station (at the LBT start timing predetermined for PUSCH transmission in the $(n+1)^{th}$ subframe)

(2) If there is data to be transmitted and the back-off counter value is not indicated by the base station, A. Maintain LBT operation (3) If there is no data to be transmitted, A. Stop LBT operation and resume the LBT operation at the LBT start timing which is configured according to [Proposed method #3]

In this case, maintaining the LBT operation can be defined as follows.

A. Follow UE implementation

B. The UE continuously performs the LBT operation (or back-off operation).

C. When PUSCH transmission is dropped, the UE stops the LBT operation, quantizes a current back-off counter value (e.g., X) (e.g., K*(floor(X/K)+1)), and resumes the back-off operation (at the LBT start timing predetermined for a next PUSCH transmission).

D. When PUSCH transmission is dropped, the UE stops the LBT operation, assumes a specific back-off counter value (e.g., maximum back-off counter), and resumes the back-off operation (at the LBT start timing predetermined for a next PUSCH transmission).

In the LAA-based wireless communication system according to the embodiment of the present invention, when a back-off operation is included in LBT for performing PUSCH transmission and a base station indicates a specific UE to transmit PUSCH in a plurality of subframes, if the specific UE fails to transmit the PUSCH in a subframe among a plurality of the subframes, it is necessary to define a method of processing the back-off operation. For example, when a UE is indicated to transmit PUSCH in an $n^{th}$ subframe and an $(n+1)^{th}$ subframe, if the UE fails to transmit PUSCH in the $n^{th}$ subframe, it is necessary to define a back-off counter value to be applied to LBT for the $(n+1)^{th}$ subframe and the timing at which the LBT is resumed. If a base station indicates a backoff counter value for the $(n+1)^{th}$ subframe, it is preferable that the UE performs LBT operation according to the indication of the base station. In this case, an LBT parameter and LBT start timing may follow the [Proposed method #3] or the [Proposed method #4].

On the contrary, if the base station does not indicate a back-off counter value to the UE, it corresponds to a case that the base station handed over leadership of the LBT operation to the UE. In this case, it may be able to permit the LBT to be performed according to UE implementation. Yet, when PUSCH transmission has a form of a UL data burst including a plurality of subframes and a plurality of UEs are indicated to perform simultaneous transmission, if two UEs drop PUSCH transmission in an $n^{th}$ subframe at the same time and the UEs resume LBT at random timing according to implementation of each UE, the two UEs may mutually interrupt UL transmission. Hence, the present invention proposes a method of setting a limitation on LBT start timing or a back-off counter value although there is no indication on a back-off counter value.

[Proposed Method #6]

When a UE applies LBT including a back-off operation to transmit PUSCH, the UE can determine whether or not a transmission gap (Tx gap) (immediately before PUSCH transmitted in an $n^{th}$ subframe) is valid according to whether or not a back-off counter value (for transmitting PUSCH in the $n^{th}$ subframe) is indicated by a base station. In this case, the base station can semi-statically configure the Tx gap (to make the Tx gap to be repeated with a prescribed interval) or dynamically configure the Tx gap (via dynamic signaling).

(1) If the UE receives indication of a back-off counter value of the base station (for the $n^{th}$ subframe), A. Tx gap (immediately before PUSCH transmitted in the $n^{th}$ subframe) is valid.

B. Data transmission is not performed in the Tx gap.

(2) If the UE does not receive indication of a back-off counter value of the base station (for the $n^{th}$ subframe), A. Tx gap (immediately before PUSCH transmitted in the $n^{th}$ subframe) is not valid.

B. Data transmission can be performed in the Tx gap.

The base station can semi-statically configure a transmission gap (Tx gap) for transmitting PUSCH to perform FR (frequency reuse) with other cells belonging to a network managed by the same service provider or flexible PUSCH scheduling. If a Tx gap is semi-statically configured with a prescribed interval and a UE is able to perform LBT operation only in the Tx gap, it may set a limitation on a length of a data burst in a unit of a length of the interval. If a base station indicates a back-off counter value to a UE, Tx gap validity of the UE is determined according to whether or not the back-off counter value is indicated to control a transmission burst length or a data burst length of the UE. In particular, in the aspect of the UE, if there is an indication of the back-off counter value, the UE applies the Tx gap to disconnect continuity from the previous signal transmission. If there is no back-off counter value indication, the UE assumes that there is no TX gap and may be able to perform continuous PUSCH transmission. FIG. 11 is a diagram for the abovementioned operation.

The operation can also be applied to a case that explicit signaling for Tx gap is delivered via DCI, or the like. Yet, it may be able to configure the explicit signaling for the Tx gap to have higher priority compared to priority of whether or not there is the back-off counter value. In this case, a length of the Tx gap can be determined according to the back-off counter value indicated by the base station.

[Proposed Method #7]

Tx gap for transmitting PDSCH or PUSCH can be semi-statically configured according to a UE or can be dynamically configured.

As shown in FIG. 10 (a), if a Tx gap is set to a fore part of a data burst (or a fore part of a subframe), it is difficult for a UE to determine whether or not PDSCH transmitted in a current subframe is transmitted in a first subframe of the data burst. As a result, the UE should perform blind detection (BD) using such a method as PDCCH detection, RS detection, or the like to find out whether or not Tx gap is applied. As a method of mitigating the abovementioned problem, it may be able to configure Tx gap to exist in every subframe which is repeated with a certain interval. In this case, although the Tx gap is dynamically allocated, there is a UE capable of detecting the Tx gap via BD, or the like or a UE incapable of detecting the Tx gap depending on capability of a UE. Hence, it is preferable that the semi-static Tx gap (or information on a subframe at which the Tx gap exists and a configuration including a relative position of the Tx gap in a subframe) is allocated according to a UE.

[Proposed Method #8]

When a UE applies LBT to transmit PUSCH, a base station can indicate a configuration of a Tx gap (within an SF in which the PUSCH is transmitted) and one of $2^N$ number of length combinations by including a bit field consisting of N number of bits in dynamic signaling. The configuration of the Tx gap can be configured as follows.

(1) No Tx gap (2) $S_1$ number of symbols positioned at a fore part (within a subframe)

(3) $S_2$ number of symbols positioned at a rear part (within a subframe)

(4) $S_1$ number of symbols positioned at a fore part and $S_2$ number of symbols positioned at a rear part (within a subframe)

The $S_1$ and the $S_2$ can be configured by a base station via higher layer signaling according to each Tx gap configuration and a length combination. (In particular, a plurality of states among the $2^N$ number of combinations may indicate a case that a configuration of Tx gap is the same but a length of TX gap is different only.)

As mentioned in the foregoing description, as shown in FIG. 10 (a), if a configuration of Tx gap is configured by symbols positioned at a fore part of a specific subframe (or a data burst), a UE should perform BD on a start point of PDSCH when a base station transmits the PDSCH. In order to solve the problem, a Tx gap for PDSCH transmission can be configured by symbols positioned at a rear part of the last subframe of a data burst.

Figure 12:
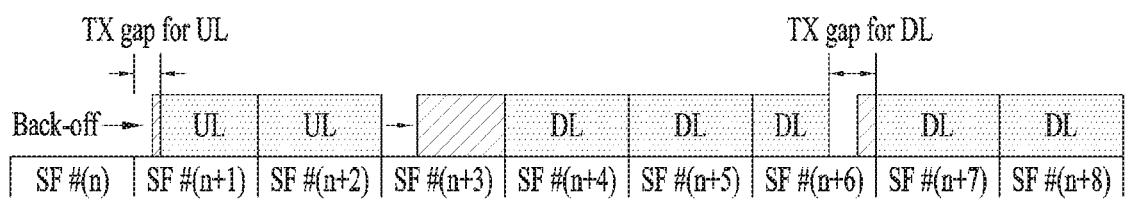
FIG. 12 is a diagram illustrating an example of configuring a transmission gap (Tx gap) using a fore part symbol only of a subframe according to a further different embodiment of the present invention.

On the contrary, a Tx gap for PUSCH transmission can be configured by symbols positioned at a fore part of a first subframe of a data burst to guarantee SRS transmission in the last symbol of a subframe. In this case, when a UL subframe is switched to a DL subframe, as shown in FIG. 12, since there is no Tx gap for DL, one subframe can be wasted.

Figure 13:
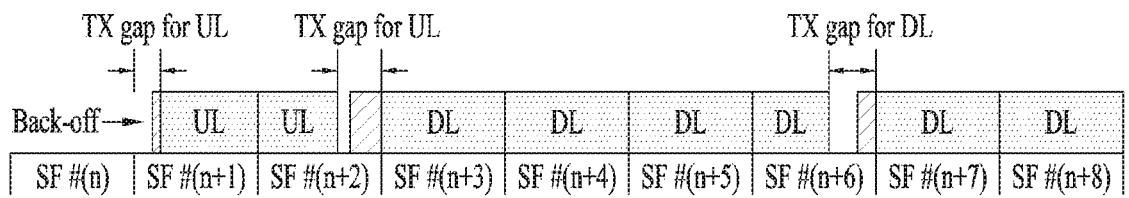
FIG. 13 is a diagram illustrating an example of configuring a transmission gap (Tx gap) using a fore part symbol and a rear part symbol of a subframe according to a further different embodiment of the present invention.

Hence, the present invention proposes a method of minimizing resource waste when switching is performed between DL and UL in a manner that a base station dynamically indicates one selected from the group consisting of a TX gap configured by symbols positioned at a fore part of a subframe, a Tx gap configured by symbols positioned at a rear part of a subframe, and a Tx gap configured by symbols positioned at a fore part of a subframe and symbols positioned at a rear part of the subframe for specific PUSCH transmission. FIG. 13 illustrates an operation of indicating a Tx gap configured by symbols positioned at a rear part of a subframe in a subframe #(n+2).

Figure 14:
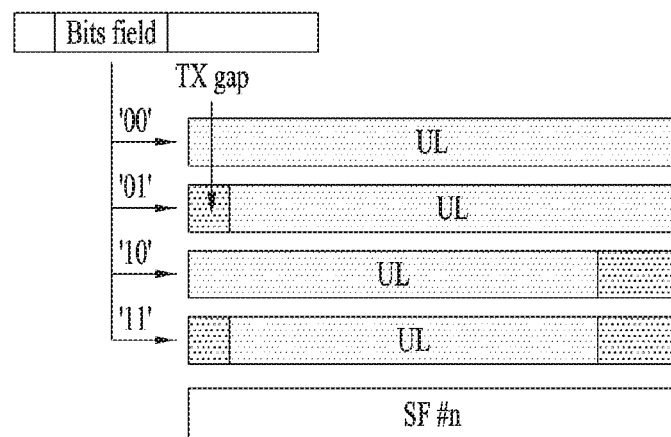
FIG. 14 is a diagram illustrating an operation of changing a configuration of a transmission gap (Tx gap) according to a further different embodiment of the present invention.

FIG. 14 is a diagram illustrating an operation of changing a configuration of a Tx gap within a UL subframe via DCI such as a UL grant or the like.

In this case, a base station can always configure a Tx gap configured by symbols positioned at a rear part (in a subframe) for the last subframe of a UL data burst at UL scheduling timing in preparation for future DL scheduling.

According to the present invention, signaling for configuring a Tx gap by S1 number of symbols positioned at a fore part of a specific subframe and signaling for configuring a Tx gap by S2 number of symbols positioned at a rear part of the specific subframe can be independently implemented. For example, a base station can independently transmit first Tx gap configuration information indicating that data transmission is restricted in M (M is an integer equal to or greater than 0) number of contiguous symbols including the very first symbol in time domain among a plurality of symbols included in a subframe and second Tx gap configuration information indicating that the data transmission is restricted in N (N is an integer equal to or greater than 0) number of contiguous symbols including the very last symbol in time domain among a plurality of the symbols included in the subframe to a UE.

It may be able to extend the operation of the [Proposed method #8]. When a base station indicates a UE to perform scheduling on a plurality of subframes, i.e., multi-SF scheduling, a bit field included in a UL grant, which has indicated the multi-SF scheduling, can indicate one of configurations of a Tx gap described in the following.

(1) No Tx gap (2) $S_1$ number of symbols positioned at a fore part (of a first subframe)

(3) $S_2$ number of symbols positioned at a rear part (of the last subframe)

(4) $S_1$ number of symbols positioned at a fore part (of a first subframe)+$S_2$ number of symbols positioned at a rear part (of the last subframe)

In this case, the $S_1$ and the $S_2$ can be determined in advance or can be configured by a base station via higher layer signaling according to a configuration of each Tx gap and a length combination.

In a different point of view, the operation of the [Proposed method #8] can be described as an operation that a base station configures a shape and a length of a partial subframe. For example, the base station can configure partial TTI (transmission time interval) via a bit field included in a UL grant as follows.

(1) No partial TTI (2) $S_1$ number of symbols positioned at a rear part (consisting of partial TTI in a first subframe)

(3) $S_2$ number of symbols positioned at a fore part (consisting of partial TTI in the last subframe)

(4) $S_1$ number of symbols positioned at a rear part (consisting of partial TTI in a first subframe)+$S_2$ number of symbols positioned at a fore part (consisting of partial TTI in the last subframe)

When the operations of the [Proposed method #8] are performed, a base station can clearly provide a starting Tx gap or a starting partial TTI and an ending Tx gap or an ending partial TTI by utilizing bit fields independent from each other. For example, the base station can provide information on the starting Tx gap and information on the ending Tx gap via a bit field of M-bit size indicating the existence and a length of the starting Tx gap and an 1-bit indicator indicating whether or not the ending Tx gap is applied, respectively.

[Proposed Method #9]

When a UE applies LBT to transmit PUSCH and changes a transmission position of an SRS, an operation of the UE can be configured as follows.

(1) Introduce shorted PUSCH, which is restricted by a length prior to a changed SRS transmission symbol, to PUSCH (2) If simultaneous transmission of PUSCH/PUCCH and SRS is not supported to a UE, the UE always drops SRS transmission when PUCCH and SRS are transmitted at the same time in an unlicensed band.

If a Tx gap for transmitting PUSCH includes the last symbol of a subframe, a problem of occasionally dropping SRS transmission may occur. Hence, preferably, if a Tx gap is configured at a rear part of a subframe, it may change a transmission position of an SRS. For example, if the Tx gap is changed with the last symbol of a subframe, the transmission position of the SRS can be changed with a previous symbol rather than the last symbol. In this case, the shorted PUSCH or the shorted PUCCH, which is configured for the UE not supporting simultaneous transmission of PUSCH/

PUCCH and SRS, is not valid anymore. Hence, the present invention considers a method of more shortening a length of PUSCH according to a changed SRS transmission symbol. Yet, in case of PUCCH, since it is unable to shorten (reduce) symbols more than a symbol positioned at a rear part due to a PUCCH format 2 type DM-RS position, it may be able to configure the UE to drop SRS transmission all the time when PUCCH and SRS are transmitted at the same time.

[Proposed Method #10]

When a UE applies LBT to transmit PUSCH, if a Tx gap for transmitting an SRS is collided with a Tx for transmitting PUSCH (or a Tx gap in a subframe in which the PUSCH is transmitted), it may put a priority on the Tx gap for transmitting PUSCH (or the Tx gap in the subframe in which the PUSCH is transmitted) to drop SRS transmission.

Similar to a legacy LTE system, if an SRS is transmitted in the last symbol of a subframe and a Tx gap is configured by symbols including the last symbol positioned at a rear part of the subframe, it may be difficult for a UE to determine whether to transmit an SRS or whether to set a limitation on UL signal transmission by maintaining the Tx gap. In this case, in order to solve the problem, it may be able to configure the Tx gap to have a higher priority compared to a priority of the SRS using a value configured to transmit a next PUSCH transmission or a PDSCH transmission.

Or, when a base station informs a UE of one of a plurality of Tx gaps, it may be able to designate a priority of an SRS according to each of a plurality of the Tx gaps.

[Proposed Method #11]

A (maximum) contention window size (CWS) can be (independently) configured according to a (maximum) length of a UL transmission burst (or a UL data burst). Yet, the (maximum) contention window size may correspond to a maximum value capable of being selected by a back-off counter value when a back-off operation is performed. (e.g., if a contention window size corresponds to N, a back-off counter value can be randomly selected from among integers ranging from 0 to N−1.)

In case of UL transmission, unlike DL transmission, the UL transmission can be performed by a shorter transmission burst length compared to the DL transmission to perform MU-MIMO or a FDM operation with other UEs. Since the length of the transmission burst is short, as a channel access probability is lower in an LBT operation, performance degradation can be higher. For example, when a success probability of channel access in a single LBT operation corresponds to p, a success probability of channel access in a single subframe can be obtained by multiplying the p by the number of subframes corresponding to a transmission burst length. Hence, preferably, if the transmission burst length is short, it is necessary to support a LBT operation of high channel access probability.

In order to solve the abovementioned problem, the present invention proposes a method of independently configuring a contention window size (CWS) according to a (maximum) UL transmission burst length. Specifically, as the (maximum) UL transmission burst length is shorter, it may be able to configure the contention window size to be smaller to increase a channel access probability.

[Proposed Method #12]

A UE can (independently) configure a size of a Tx gap according to a (maximum) length of a UL transmission burst (or a UL data burst). In this case, the Tx gap can be positioned at the fore part or a rear part of the UL transmission burst (or the UL data burst).

In this case, the UE is able to know the (maximum) length of the UL transmission burst (or the UL data burst) using methods described in the following.

(1) A base station transmits DCI for scheduling multiple subframes and the UE identifies the (maximum) length of the UL transmission burst (or the UL data burst) based on the scheduling information.

(2) If the UE receives scheduling on the N number of contiguous subframes, the UE is able to recognize the maximum) length of the UL transmission burst (or the UL data burst) using a function of the N.

It is preferable to configure a length of a Tx gap for UL transmission in proportion to a contention window size in a UL LBT operation in the aspect of increasing a channel access probability. For example, if a Tx gap is positioned at a fore part of a UL transmission burst and a length of the Tx gap is too small compared to a contention window size, a UE may fail to perform UL channel access in the Tx gap. In particular, as shown in FIG. 10 (a), such an inefficient case that reservation is performed during one subframe may occur. In this case, as mentioned earlier in the [Proposed method #11] of the present invention, if a contention window size is configured according to a (maximum) size of a UL transmission burst (or a UL data burst), a length of a Tx gap can also be (independently) configured according to the (maximum) size of the UL transmission burst (or the UL data burst). Specifically, as the (maximum) length of the UL transmission burst is bigger, it may be able to configure the size of the Tx gap to be bigger to increase a channel access probability.

[Proposed Method #13]

When a UE receives UL transmission scheduling on (N number of) contiguous subframes, if the UE succeeds in transmitting a specific subframe among the contiguous subframes, the UE can transmit the contiguous subframes without an LBT operation.

When a UE guesses a start and an end of a UL transmission burst via UL scheduling information of a base station, if the UE receives UL transmission scheduling for contiguous subframes, the UE can recognize the UL transmission scheduling as a UL transmission burst. In particular, if the UE succeeds in transmitting a specific subframe among the contiguous subframes, the UE assumes that the subframes are included in the same UL transmission burst and can perform transmission without an LBT operation.

[Proposed Method #14]

When a UE receives UL transmission scheduling on (N number of) contiguous subframes, the UE can continuously transmit the subframes without applying a Tx gap to the subframes.

Similar to the [Proposed method #13], when a UE guesses a start and an end of a UL transmission burst via UL scheduling information of a base station, if the UE receives UL transmission scheduling for contiguous subframes, the UE can recognize the UL transmission scheduling as a UL transmission burst. In this case, it is preferable that a Tx gap is configured to be positioned at a fore part or a rear part of the UL transmission burst performing an LBT operation. In this case, the UE assumes that the contiguous subframes scheduled by the base station are included in the UL transmission burst and may not apply a Tx gap to the subframes.

In case of the [Proposed method #13] and the [Proposed method #14], the base station configures a maximum length of the UL transmission burst in advance via higher layer signaling and the UE may consider contiguous subframes within the maximum length as a UL transmission burst only.

For example, if the UE continuously receives scheduled PUSCH for 8 subframes and a maximum length of a UL transmission burst is configured by 4 ms, the UE considers the 8 subframes as 2 UL transmission bursts in a unit of 4 subframes and performs a UL LBT.

[Proposed Method #15]

A base station configures an additional TA offset and may be able to inform a UE of whether or not the additional TA offset is applied via higher layer signaling or DCI.

A Tx gap for a UL transmission burst can be configure for 2 purposes. One is to prepare a space for performing LBT to transmit contiguous UL transmission bursts and another one is to prepare a space for performing LBT to transmit contiguous DL transmission bursts after the UL transmission.

In LTE system according to the embodiment of the present invention, a part of DL subframe is transmitted only for a DL transmission burst and the latter part of the subframe corresponds to an ending partial subframe excluded from TTI. The ending partial subframe has an effect identical to a case of configuring a Tx gap at the latter part of the DL transmission burst.

When a structure of the DL transmission burst is considered, it is natural that a Tx gap for a UL transmission burst is configured at the latter part of the UL transmission burst. Yet, when UL transmission is performed in the LTE system, if an SRS symbol is configured to be transmitted at the last symbol, i.e., if a Tx gap is configured at the latter part of a subframe or a partial subframe is configured to exclude an SRS symbol, it may have a situation that whether or not an SRS is transmitted is unclear. In order to solve the problem, the Tx gap for the UL transmission burst can be configured at the fore part of the UL transmission burst. However, the above configuration may have a problem that a Tx gap for DL transmission is not guaranteed when a UL subframe is switched to a DL subframe.

Hence, the present invention proposes a method of configuring an additional TA value to guarantee a Tx gap when a UL subframe is switched to a DL subframe. Then, a base station can perform LBT for transmitting a DL transmission burst by utilizing the Tx gap guaranteed by the additional TA value after UL is received.

In the LTE system according to the embodiment of the present invention, a UL TA can be defined as follows.

"Transmission of a UL radio frame number i transmitted from a UE can be performed prior to transmission of a corresponding DL radio frame as much as $(N_{TA} N_{TA\ offset}) \times T_s$. In this case, an $N_{TA}$ value can be included in a range of $0 \le N_{TA} \le 20512$. And, an $N_{TA\ offset}$ value may correspond to 0 in case of a frame structure type 1 and 624 in case of a frame structure type 2. Yet, the $N_{TA\ offset}$ value can be differently configured according to a configuration."

In this case, a TA offset value, which is introduced to prepare a Tx gap between UL and DL in the [Proposed method #15], can be configured by one of the methods described in the following.

(1) Adjust a legacy $N_{TA\ offset}$ value
 A. Change the TA offset in a configurable manner via RRC signaling
 B. Configure by a fixed value (e.g., value greater than 624) in a frame structure 3
(2) Add additional $N_{Gap}$
 A. Configure via RRC signaling
 B. Configure by a fixed value (e.g., value greater than 624) in a frame structure 3

In this case, if the $N_{Gap}$ is introduced, the aforementioned definition on the UL TA can be changed to $(N_{TA}+N_{TA\ offset}+N_{Gap}) \times TS$ from $(N_{TA}+N_{TA\ offset}) \times T_S$.

[Proposed Method #16]

If SRS transmission is indicated in an SRS subframe and one of the following is satisfied, (1) If a Tx gap is configured in an SRS subframe and an SRS is included in the Tx gap, (2) If a partial TTI transmission is indicated in an SRS subframe and an SRS symbol is not included in the partial TTI, (3) If there is no PUSCH (or PUCCH) transmission in an SRS subframe, (4) If a base station indicates an LBT operation considering an SRS symbol via DCI, When a UE intends to transmit an UL signal (e.g., PUSCH) in a subframe immediately after an SRS subframe, the UE performs LBT prior to an SRS symbol of the SRS subframe. If there is an SRS to be transmitted by the UE exists, the UE transmits the SRS in the SRS symbol. Otherwise, the UE transmits a reservation signal in the SRS symbol. Subsequently, the UE can transmit the UL signal (e.g., PUSCH).

According to the [Proposed method #10], if an SRS is included in a Tx gap (or, if an SRS is not included in a partial TTI), SRS transmission is dropped. Yet, if a UL signal transmission exists after the SRS, it may be preferable that the SRS transmission is permitted. In this case, LBT for transmitting a UL signal, which is transmitted in a subframe appearing after a subframe in which the SRS is transmitted, should be performed in consideration of the SRS symbol.

For example, if there is PUSCH to be transmitted in a subframe appearing after a subframe in which an SRS is transmitted and an SRS exists in the subframe in which the SRS is transmitted, a UE performs a UL LBT operation prior to an SRS symbol. If the UE succeeds in performing the UL LBT operation, the UE transmits the SRS in the SRS symbol and can continuously perform PUSCH transmission. Or, if there is PUSCH to be transmitted in a subframe appearing after a subframe in which an SRS is transmitted and an SRS does not exist in the subframe in which the SRS is transmitted, a UE performs a UL LBT operation prior to an SRS symbol in order not to interrupt SRS transmission of a different UE. If the UE succeeds in performing the UL LBT operation, the UE performs multiplexing with a different SRS to transmit a reservation signal in the SRS symbol and can continuously perform PUSCH transmission.

In particular, when a UE performs UL transmission in a subframe appearing after a subframe in which an SRS is transmitted, the UE may configure a UL LBT to be successful prior to an SRS symbol of the subframe in which the SRS is transmitted and can indicate an SRS or a reservation signal to be transmitted in the SRS symbol.

[Proposed Method #17]

When a base station configures a Tx gap in a subframe in which an SRS is transmitted and the SRS is included in the Tx gap (or, when a partial TTI transmission is indicated in the subframe in which the SRS is transmitted and an SRS symbol is not included in the partial TTI), a length of the SRS symbol can be added to a length of the configured Tx gap (or, the length of the SRS symbol can be subtracted from a length of the partial TTI.)

Although an SRS symbol is included in a Tx gap in a subframe in which an SRS is transmitted, as mentioned earlier in the [Proposed method #16], SRS transmission can be performed according to an operation of a subframe appearing after the subframe in which the SRS is transmitted. In this case, if the SRS is transmitted, it may have an effect that a length of the Tx gap is decreased as much as the SRS symbol. Consequently, a UL LBT period for performing a next UL transmission is decreased.

Hence, if a TX gap is configured in a subframe in which an SRS is transmitted, the present invention proposes a method of adding a length of an SRS symbol to a length of the Tx gap in consideration of the SRS transmitted in the SRS symbol. For example, if a Tx gap corresponding to a length of two symbols is configured in the subframe in which the SRS is transmitted, the Tx gap can be interpreted as a Tx gap corresponding to a length of 3 symbols by adding an SRS symbol length to the Tx gap. Yet, when the SRS symbol length is added, it may apply a constraint according to a maximum Tx gap length. For example, when a maximum Tx gap length corresponds to 3 symbols, if a Tx gap corresponding to a length of 3 symbols is already set to a UE, it may not additionally apply an SRS symbol length to the UE. The abovementioned operation can be applied as an operation of subtracting an SRS symbol length from a length of a partial TTI in an opposite point of view. In this case, it may apply a minimum value constraint to the partial TTI length.

[Proposed Method #18]

It may assume an ending Tx gap corresponding to a prescribed time period in a UL subframe prior to a subframe configured as a DL subframe by a base station in advance (in particular, a Tx gap is formed after a UL subframe).

Yet, if there is separate signaling of the base station on the ending Tx gap, it may follow the signaling. If there is signaling of the base station on a starting Tx gap (a Tx gap is formed prior to a UL subframe), the ending Tx gap and the starting Tx gap can be duplicately applied.

If a base station configures subframes for monitoring a DL signal via a semi-static method or DCI, a UE may prepare a Tx gap for performing a DL LBT operation for the DL subframes at least. For example, the UE can configure symbols positioned at a rear part of a UL subframe appearing prior to the DL subframes as a Tx gap. It may consider methods described in the following as a method of indicating the DL subframes.

(1) The base station semi-statically configures the DL subframes via higher layer signaling such as RRC, and the like.

(2) A position of a next DL subframe is designated via (common) DCI.

(3) Whether or not an ending Tx gap is applied is indicated via a UE-specific DCI.

A. if the ending Tx gap is indicated, it implies that a next subframe corresponds to a DL subframe.

The UE applies the starting Tx gap to a UL transmission burst to solve an SRS transmission dropping problem and may additionally apply the ending Tx gap at the time of switching to a DL subframe only.

[Proposed Method #19]

A base station can inform a UE of whether or not an initial partial subframe (i.e., a subframe performing signal transmission in the middle of the subframe when LBT is performed in the subframe and channel access is succeeded) is applied and start points of the initial partial subframe via higher layer signaling or a dynamic control signal (e.g., DCI).

In this case, if the UE succeeds in accessing a channel prior to a start point configured by the base station (after the LBT is performed), the UE can perform signal transmission at the start point.

When the UE transmits a UL transmission burst by performing a UL LBT operation, it is preferable to perform a UL signal transmission immediately after timing capable of performing transmission after the LBT is performed. Yet, since the LTE system according to the embodiment of the present invention is designed to transmit data by configuring TTI in a unit of 1 ms or a subframe, although remaining time in a subframe is less than 1 ms immediately after the LBT operation is successfully performed, it may be necessary to have an operation of permitting a UL signal to be transmitted. In this case, if the UE randomly applies an initial partial TTI, since a base station is not aware of whether or not the initial partial TTI corresponds to a partial TTI, reception performance can be considerably degraded.

Hence, according to the present invention, a base station can configure whether or not an initial partial TTI is used via RRC signaling and the like. Or, the base station can configure a specific UL subframe through a dynamic control signal (e.g., UL grant).

[Proposed Method #20]

A base station can transmit information on whether or not a partial subframe (or, Tx gap) is applied, configuration information (i.e., length and position), and information on a UL subframe to which the partial subframe (or Tx gap) is applied through a DL grant DCI, a cell-specific DCI (or common DCI), or PHICH in a DL subframe.

The base station can inform a UE of information on a partial subframe (or Tx gap) to be applied to a UL subframe using a UL grant indicating PUSCH to be transmitted in the UL subframe. However, when it is necessary to support PUCCH transmission in an unlicensed band of LAA system, it is able to identify the information on the partial subframe (or Tx gap) indicated by the base station in the UL grant corresponding to the PUSCH only when PUSCH is transmitted to the UL subframe in which PUCCH is transmitted. Hence, the base station can deliver the information on the partial subframe (or Tx gap) to be applied to the UL subframe to the UE in a manner of including the information in a common DCI transmitted in a DL subframe to make the UE apply the information to more various UL channels. For example, a common DCI transmitted in an $n^{th}$ DL subframe can indicate that an $(n+4)^{th}$ subframe corresponds to a UL subframe and a partial subframe (or Tx gap) is applied to the UL subframe. Or, the base station can inform the UE of a PUCCH transmission subframe corresponding to a current DL subframe and information on whether or not a partial subframe (or Tx gap) is applied to PUSCH transmission indicated by a UL grant in the current DL subframe through a common DCI. As a different method, the base station can inform the UE of information on whether or not a partial subframe (or Tx gap) is applied to a UL subframe in which PUCCH is transmitted by including the information in a DL grant indicating PDSCH transmission.

[Proposed Method #21]

When a base station sets a partial subframe (or Tx gap) to a specific UL subframe via a dynamic control signal, a UE can transmit PUCCH as follows at the time of transmitting the PUCCH in the UL subframe.

(1) Transmit a shortened PUCCH format corresponding to the partial subframe (or Tx gap) configured via the dynamic control signal (2) Transmit a shortened PUCCH format configured by the base station via higher layer signaling In this case, the shortened PUCCH format may have forms described in the following.

(1) A form that a partial symbol positioned at a fore part of a UL subframe is excluded.

(2) A form that a partial symbol positioned at a rear part of a UL subframe is excluded.

(3) A form that a partial symbol positioned at a fore part and a partial symbol positioned at a rear part of a UL subframe are excluded.

When it is necessary to support PUCCH transmission in an unlicensed band of LAA system, if the PUCCH transmission is supported not only for a UL subframe but also for a partial subframe, it may be able to more easily design HARQ-ACK timing. When the PUCCH is transmitted in the partial subframe, as mentioned earlier in the [Proposed method #20], if there exists a common DCI and the common DCI informs the UL subframe in which PUCCH is to be transmitted of whether or not the partial subframe (or Tx gap) is applied, it may be able to transmit a shortened PUCCH format according to a configuration of the base station. Yet, if the common DCI does not exist, it is not clear whether or not a partial subframe (or Tx gap) is applied to a subframe in which PUCCH is to be transmitted. In this case, the base station can indicate the UE to apply a shortened PUCCH format by assuming a partial subframe (or TX gap) all the time as a conservative method.

In this case, an operation of configuring a Tx gap may correspond to an operation of configuring a partial TTI in the present invention. For example, a starting Tx gap corresponds to an operation of configuring a partial TTI, which starts in the middle of a subframe and ends at a subframe boundary. An ending Tx gap may correspond to an operation of configuring a partial TTI, which starts at a subframe boundary and ends in the middle of a subframe.

[Proposed Method #22]

It may be able to configure a plurality of TA offset values predetermined between a base station and a UE (or, the base station may set a plurality of TA offset values to the UE via higher layer signaling) and it may be able to indicate the UE to apply one of a plurality of the TA offset values via a UL grant (or common DCI).

In this case, the UE may additionally apply a value corresponding to the TA offset value to a reference TA value or may apply the TA offset value as a TA value.

As mentioned earlier in the [Proposed method #15], a Tx gap for a UL transmission burst can be configured for 2 purposes. One is to prepare a space for performing LBT to transmit contiguous UL transmission bursts and another one is to prepare a space for performing LBT to transmit contiguous DL transmission bursts after the UL transmission. In this case, it is necessary to consider a Tx gap for two cases including a case of switching to DL from UL (UL-to-DL) and a case of switching to UL from DL (UL-to-DL).

In this case, as mentioned earlier in the [Proposed method #15], when UL is switched to DL, a Tx gap can be configured by utilizing a TA value which is applied to perform UL transmission. In particular, it may additionally apply a TA offset as much as a Tx gap necessary for switching to DL from UL in addition to a legacy TA value. In this case, it is preferable that the TA offset is provided as much as an offset necessary for performing CCA for DL transmission transmitted after a UL transmission burst. If a UL grant is transmitted only while DL transmission is performed and it is able to perform a single CCA slot-based LBT, it is necessary to support a more shortened TA offset. Hence, the present invention proposes a method of indicating a UE to apply one of a plurality of TA offsets via a UL grant (or common DCI).

In this case, if a TA offset value is indicated by a UL grant (or common DCI), a base station can indicate the TA offset value in a manner of jointly encoding the TA offset value with a Tx gap.

[Proposed Method #23]

When a base station informs a UE of information on whether or not a Tx gap exists and a length of the Tx gap via a bit field of a UL grant (or common DCI), the length of the Tx gap indicated by a state of the bit field can be differently interpreted according to a UL LBT type (or UL scheduling type).

In this case, the UL LBT type can include a single CCA slot-based LBT, a UL Cat.4 LBT, and a shorten Cat.4 LBT.

Yet, the UL scheduling type can include cross-carrier scheduling or self-carrier scheduling. In this case, the shorten Cat.4 LBT corresponds to LBT that a contention window size is configured to be smaller than that of the general Cat.4 LBT. For example, the shorten Cat.4 LBT may corresponds to LBT to which one of [3,7] is applied as a contention window size.

If the base station informs the UE of information on whether or not a starting Tx gap exists using 1-bit length, the UE may consider that a Tx gap of a length predetermined with the base station is applied. In this case, if a UL LBT scheme supports 2 LBT types and a space necessary for performing CCA is different according to each of the LBT types, it may be preferable that the UE applies a Tx gap of an appropriate length according to a corresponding LBT type.

For example, when the base station informs the UE that a starting Tx gap exists, if a UL LBT type corresponds to a single CCA slot-based LBT, the UE assumes that a length of the Tx gap corresponds to 1 SC-FDMA symbol. On the contrary, if the UL LBT type corresponds to the aforementioned UL Cat.4 LBT, the US may assume that the length of the Tx gap corresponds to 3 SC-FDMA symbols. Or, since the LBT type may vary according to the UL scheduling type, the UE may differently assume a length of the Tx gap according to the UL scheduling type. For example, in case of the self-carrier scheduling, it is necessary to have a Tx gap of a length corresponding to 1 symbol. On the contrary, in case of the cross-carrier scheduling, it is necessary to have a Tx gap of a length corresponding to 3 symbols.

[Proposed Method #24]

A base station includes a specific bit field of a UL grant (or common DCI) and may utilize the bit field to indicate a contention window size (CWS) or a back-off counter according to a UL scheduling type.

In this case, the UL scheduling type can include cross-carrier scheduling or self-carrier scheduling.

In this case, the specific bit field can be comprehended as follows according to the UL scheduling type.

(1) In case of the self-carrier scheduling, the bit filed can be utilized for indicating a back-off counter.

(2) In case of the cross-carrier scheduling, the bit filed can be utilized for indicating a contention window size.

Although the UL Cat.4 LBT is applied as a UL LBT scheme for transmitting PUSCH, an LBT parameter of the UL Cat.4 LBT may vary depending on a UL scheduling type. For example, in case of the cross-carrier scheduling, a contention window size is selected from among {16, 32, 64} according to CWS adaptation. On the other hand, in case of the self-carrier scheduling, a contention window size can be fixed by 4.

When a base station indicates an LBT parameter for the UL Cat.4 LBT to a UE via a UL grant (or common DCI), if a range of a back-off counter value is wide such as the cross-carrier scheduling, it may be preferable to indicate a contention window size value rather than a back-off counter value in terms of control overhead signaling. On the contrary, if a range of a back-off counter value is narrow such as the self-carrier scheduling, it is preferable to directly indicate the back-off counter value when FDM and the like are indicated between UL UEs. Hence, the present invention proposes a method of differently interpreting the same bit field of a UL grant (or common DCI) according to a UL scheduling type. In particular, the bit field may indicate a contention window size or a back-off counter depending on a UL scheduling type.

In this case, one state of the bit field indicating the contention window size (or the back-off counter) may indicate a single CCA slot-based LBT operation. If a UE is indicated by another state, the UE may assume that a UL Cat.4 LBT operation is performed (for UL transmission).

Figure 15:
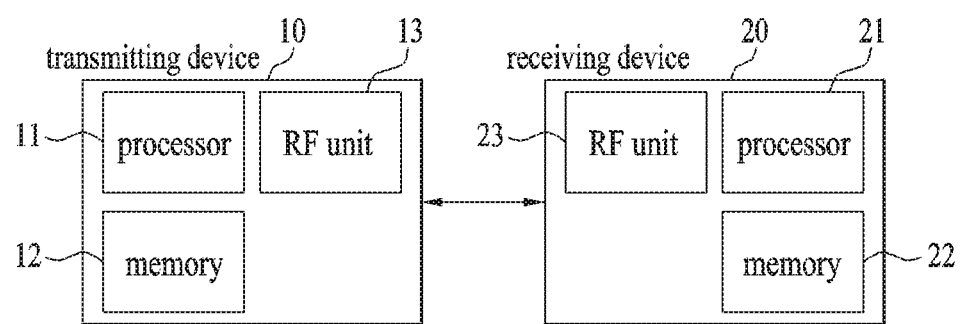
FIG. 15 is a block diagram of a device for implementing embodiment(s) of the present invention.

FIG. 15 is a block diagram illustrating elements of a transmitting device 10 and a receiving device 20 for implementing the embodiment(s) of the present invention. The transmitting device 10 and the receiving device 20 include radio frequency (RF) units 13 and 23 for transmitting or receiving a wire and/or radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output information. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs predetermined coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt is a positive integer greater than 1) transmitting antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr receiving antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

Specifically, it may apply a UE as the transmitting device 10 according to the present invention. The processor 11 of the transmitting device 10 is configured to control the RF unit 13 to receive LBT (listen before talk) type information and information on a UL data transmission period during which the data is transmitted in a subframe and transmit the data to the base station via the unlicensed band during the UL data transmission period only in the subframe based on an LBT operation indicated by the LBT type information.

In this case, the information on the UL data transmission period can include starting position information on a start position at which the transmission of the data starts in the subframe. The starting position information can indicate one selected from the group consisting of a start point of a symbol #0 of the subframe, a start point of a symbol #1 of the subframe, timing after 25 us from the start point of the symbol #0 of the subframe, and timing after 25 us+TA (timing advance) applied to the UE from the start point of the symbol #0 of the subframe.

And, it may apply a base station as the receiving device 20 according to the present invention. The processor 21 of the receiving device 20 is configured to control the RF unit 23 to transmit LBT (listen before talk) type information and information on a UL data transmission period during which the data is transmitted in a subframe to a separate UE and receive the data from the UE during the UL data transmission period only in the subframe based on an LBT operation indicated by the LBT type information.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be used by a wireless communication device such as a terminal, a relay, a base station, and the like operating in an unlicensed band.

What is claimed is:

1. A method for transmitting an uplink signal by a user equipment in a wireless communication system, the method comprising:
receiving, from a base station, downlink control information (DCI) scheduling the uplink signal, wherein the DCI comprises channel sensing operation type information and information related to an uplink signal transmission period, and
wherein the channel sensing operation type information indicates one of a plurality of predetermined channel sensing operation types;
based on that the channel sensing operation type information indicates a first type channel sensing operation:
performing the first type channel sensing operation; and
based on the first type channel sensing operation, transmitting, to the base station, the uplink signal in the uplink signal transmission period;
based on that the channel sensing operation type information indicates a second type channel sensing operation:
performing the second type channel sensing operation; and
based on the second type channel sensing operation, transmitting, to the base station, the uplink signal in the uplink signal transmission period,
wherein the channel sensing operation type information comprises at least one bit,
wherein one of the plurality of predetermined channel sensing operation types is indicated based on the at least one bit,
wherein the at least one bit with a first value is mapped to the first type channel sensing operation, and
wherein the at least one bit with a second value is mapped to the second type channel sensing operation.

2. The method of claim 1, wherein the plurality of predetermined channel sensing operation types comprises:
the first type channel sensing operation type related to performing channel sensing operation based on random back-off, and
the second type channel sensing operation related to performing channel sensing operation based on a clean channel assessment (CCA) result value after CCA is performed in a predetermined time.

3. The method of claim 2, wherein based on that the channel sensing operation type information indicates the first type channel sensing operation, the DCI further comprises information on identifying a priority class among a plurality of priority classes, and
wherein a parameter value configured for the first type channel sensing operation is identified based on the priority class.

4. The method of claim 3, wherein the parameter value comprises at least one of a defer period length, a minimum contention window size (CWS), a maximum contention window size, or maximum channel occupancy time (MCOT).

5. The method of claim 1, wherein the information related to the uplink signal transmission period comprises starting position information on a starting position in a subframe of the uplink signal transmission period.

6. The method of claim 5, wherein the starting position information is one among a plurality of positional information,
wherein the plurality of positional information comprises:
a start position of a symbol #0 of the subframe,
a start position of a symbol #1 of the subframe,
timing after 25µ from the start position of the symbol #0 of the subframe, and timing after 25µ+TA (timing advance) applied to the user equipment from the start position of the symbol #0 of the subframe, and
wherein the subframe comprises symbols from the symbol #0 to a symbol #13.

7. The method of claim 5, wherein the channel sensing operation type information and the starting position information are jointly coded.

8. The method of claim 5, wherein the information on the uplink signal transmission period further comprises transmission gap configuration information on the transmission of the uplink signal restricted in N number of contiguous symbols with a last symbol in time domain among a plurality of symbols included in the subframe, where N denotes an integer greater than or equal to zero.

9. The method of claim 1, wherein the information on the uplink signal transmission period comprises:
first transmission gap configuration information on the transmission of the uplink signal restricted in M number of contiguous symbols with a $1^{st}$ symbol in time domain among a plurality of symbols included in the subframe, where M denotes an integer greater than or equal to zero, and
second transmission gap configuration information on the transmission of the uplink signal restricted in N number of contiguous symbols with a last symbol in time domain among a plurality of symbols included in the subframe, where N denotes an integer greater than or equal to zero.

10. The method of claim 1,
wherein the first type channel sensing operation and the second channel sensing operation are performed during a period in a subframe which is different from the uplink data transmission period in the subframe, respectively.

11. A method for receiving an uplink signal by a base station in a wireless communication system, the method comprising:
transmitting, to a user equipment, downlink control information (DCI) scheduling the uplink signal, wherein the DCI comprises channel sensing operation type information and information related to an uplink signal transmission period,
wherein the channel sensing operation type information indicates one of a plurality of predetermined channel sensing operation types; and
based on that the channel sensing operation type information indicates a first type channel sensing operation, receiving, from the user equipment, the uplink signal in the uplink transmission period based on the first type channel sensing operation performed by the user equipment, and
based on that the channel sensing operation type information indicates a second type channel sensing operation, receiving, from the user equipment, the uplink signal in the uplink transmission period based on the second type channel sensing operation performed by the user equipment,
wherein the channel sensing operation type information comprises at least one bit,
wherein one of the plurality of predetermined channel sensing operation types is indicated based on the at least one bit,
wherein the at least one bit with a first value is mapped to the first type channel sensing operation, and
wherein the at least one bit with a second value is mapped to the second type channel sensing operation.

12. A user equipment for transmitting an uplink signal in a wireless communication system, the user equipment comprising:
a memory; and
at least one processor coupled with the memory and configured to:
receive, from a base station, downlink control information (DCI) scheduling the uplink signal,
wherein the DCI comprises channel sensing operation type information and information related to an uplink signal transmission period, and
wherein the channel sensing operation type information indicates one of a plurality of predetermined channel sensing operation types;
based on that the channel sensing operation type information indicates a first type channel sensing operation:
perform the first type channel sensing operation; and
based on the first type channel sensing operation, transmit, to the base station, the uplink signal in the uplink signal transmission period;

based on that the channel sensing operation type information indicates a second type channel sensing operation:
perform the second type channel sensing operation; and
based on the second type channel sensing operation, transmit, to the base station, the uplink signal in the uplink signal transmission period,
wherein the channel sensing operation type information comprises at least one bit,
wherein one of the plurality of predetermined channel sensing operation types is indicated based on the at least one bit,
wherein the at least one bit with a first value is mapped to the first type channel sensing operation, and
wherein the at least one bit with a second value is mapped to the second type channel sensing operation.

13. The user equipment of claim 12, wherein the information related to the uplink signal transmission period comprises starting position information on a starting position, in a subframe of the uplink signal transmission period.

14. The user equipment of claim 13, wherein the starting position information is one among a plurality of positional information,
wherein the plurality of positional information comprises:
a start position of a symbol #0 of the subframe,
a start position of a symbol #1 of the subframe,
timing after 25μ from the start position of the symbol #0 of the subframe, and timing after 25μ+TA (timing advance) applied to the user equipment from the start position of the symbol #0 of the subframe, and
wherein the subframe comprises symbols from the symbol #0 to a symbol #13.

15. A base station for receiving an uplink signal in a wireless communication system, the base station comprising:
a memory; and
at least one processor coupled with the memory and configured to:
transmit, to a user equipment, downlink control information (DCI) scheduling the uplink signal,
wherein the DCI comprises channel sensing operation type information and information related to an uplink signal transmission period,
wherein the channel sensing operation type information indicates one of a plurality of predetermined channel sensing operation types; and
based on that the channel sensing operation type information indicates a first type channel sensing operation, receive, from the user equipment, the uplink signal in the uplink transmission period based on the first type channel sensing operation performed by the user equipment, and
based on that the channel sensing operation type information indicates a second type channel sensing operation, receive, from the user equipment, the uplink signal in the uplink transmission period based on the second type channel sensing operation performed by the user equipment,
wherein the channel sensing operation type information comprises at least one bit,
wherein one of the plurality of predetermined channel sensing operation types is indicated based on the at least one bit,
wherein the at least one bit with a first value is mapped to the first type channel sensing operation, and
wherein the at least one bit with a second value is mapped to the second type channel sensing operation.

* * * * *